US009020030B2

(12) United States Patent
Chen et al.

(10) Patent No.: US 9,020,030 B2
(45) Date of Patent: Apr. 28, 2015

(54) SMOOTHING OVERLAPPED REGIONS RESULTING FROM GEOMETRIC MOTION PARTITIONING

(75) Inventors: Peisong Chen, San Diego, CA (US); Xianglin Wang, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 571 days.

(21) Appl. No.: 13/013,687

(22) Filed: Jan. 25, 2011

(65) Prior Publication Data

US 2011/0200110 A1  Aug. 18, 2011

Related U.S. Application Data

(60) Provisional application No. 61/305,892, filed on Feb. 18, 2010, provisional application No. 61/323,233, filed on Apr. 12, 2010, provisional application No. 61/323,244, filed on Apr. 12, 2010.

(51) Int. Cl.
 H04B 1/66 (2006.01)
 H04N 19/119 (2014.01)
 (Continued)

(52) U.S. Cl.
 CPC ............ *H04N 19/119* (2014.11); *H04N 19/52* (2014.11); *H04N 19/122* (2014.11); *H04N 19/137* (2014.11); *H04N 19/17* (2014.11); *H04N 19/537* (2014.11); *H04N 19/543* (2014.11)

(58) Field of Classification Search
 CPC ............... H04N 19/00072; H04N 19/0084; H04N 19/00145; H04N 19/0026; H04N 19/00624; H04N 19/00696
 USPC ............ 348/222.1, 390.1, 699, 209.99; 382/294, 239, 154, 100, 232, 236, 162, 382/164, 166, 225, 276, 260, 261, 266, 303, 382/240; 375/240.01–240.26
 See application file for complete search history.

(56) References Cited

U.S. PATENT DOCUMENTS 5,748,789 A  5/1998 Lee et al.
6,665,342 B1  12/2003 Brown et al.
(Continued)

FOREIGN PATENT DOCUMENTS

CN  101536528 A  9/2009
CN  101605261 A  12/2009
(Continued)

OTHER PUBLICATIONS

Divorra Escoda, et al.,"Geometry-Adaptive Block Partitioning for Video Coding",2007 IEEE International Conference on Acoustics, Speech, and Signal Processing Apr. 15-20, 2007 Honolulu, HI, USA, IEEE, Piscataway, NJ, USA, Apr. 15, 2007, pp. 1-657 ISBN: 978-1-4244-0727-9.

(Continued)

*Primary Examiner* — Behrooz Senfi
(74) *Attorney, Agent, or Firm* — Todd E. Marlette

(57) ABSTRACT

In one example, an apparatus includes a video encoder configured to partition a block of video data into a first partition and a second partition using a geometric motion partition line, calculate a prediction value of a pixel in a transition region of the block using a filter that applies a value for at least one neighboring pixel from the first partition and a value for at least one neighboring pixel from the second partition, calculate a residual value of the pixel in the transition region of the block based on the prediction value of the pixel in the transition region, and output the residual value of the pixel. In one example, a video decoder may use a similar filter to decode an the encoded block after receiving the residual value for the encoded block, and using a definition of the geometric motion partition line.

48 Claims, 11 Drawing Sheets

(51) Int. Cl.
*H04N 19/52* (2014.01)
*H04N 19/122* (2014.01)
*H04N 19/137* (2014.01)
*H04N 19/17* (2014.01)
*H04N 19/537* (2014.01)
*H04N 19/543* (2014.01)
*H04N 5/225* (2006.01)

(56) References Cited

U.S. PATENT DOCUMENTS

| | | | |
|---|---|---|---|
| 8,280,181 B2* | 10/2012 | Rai | 382/260 |
| 2003/0156651 A1 | 8/2003 | Streater et al. | |
| 2003/0202594 A1 | 10/2003 | Lainema | |
| 2003/0227975 A1 | 12/2003 | Chang | |
| 2007/0133690 A1 | 6/2007 | Xin et al. | |
| 2008/0008242 A1 | 1/2008 | Lu et al. | |
| 2008/0101707 A1 | 5/2008 | Mukherjee et al. | |
| 2008/0159387 A1 | 7/2008 | Dvir et al. | |
| 2008/0240242 A1 | 10/2008 | Lainema | |
| 2008/0240246 A1 | 10/2008 | Lee et al. | |
| 2008/0260275 A1 | 10/2008 | Ueno et al. | |
| 2009/0046781 A1 | 2/2009 | Moriya et al. | |
| 2009/0060362 A1 | 3/2009 | Harmanci et al. | |
| 2009/0196342 A1 | 8/2009 | Divorra Escoda et al. | |
| 2009/0238283 A1 | 9/2009 | Han | |
| 2009/0268810 A1 | 10/2009 | Dai | |
| 2010/0118959 A1 | 5/2010 | Lou et al. | |
| 2010/0208818 A1 | 8/2010 | Yin et al. | |
| 2010/0208827 A1 | 8/2010 | Divorra Escoda et al. | |
| 2011/0200097 A1 | 8/2011 | Chen et al. | |
| 2011/0200109 A1 | 8/2011 | Joshi et al. | |
| 2011/0200111 A1 | 8/2011 | Chen et al. | |
| 2011/0228853 A1* | 9/2011 | Suzuki et al. | 375/240.16 |
| 2011/0249751 A1 | 10/2011 | Laroche et al. | |
| 2012/0099642 A1 | 4/2012 | Sole et al. | |
| 2012/0106647 A1 | 5/2012 | Jung et al. | |
| 2012/0177106 A1* | 7/2012 | Divorra Escoda et al. | 375/240.03 |

FOREIGN PATENT DOCUMENTS

| | | |
|---|---|---|
| JP | 2002223445 A | 8/2002 |
| JP | 2004015803 A | 1/2004 |
| JP | 2005277968 A | 10/2005 |
| JP | 2007235931 A | 9/2007 |
| JP | 2008054267 A | 3/2008 |
| JP | 2008301336 A | 12/2008 |
| JP | 2008306413 A | 12/2008 |
| JP | 2009284275 A | 12/2009 |
| JP | 2009545920 A | 12/2009 |
| WO | 2008016609 A2 | 2/2008 |
| WO | 2008054688 A1 | 5/2008 |
| WO | 2009051719 A1 | 4/2009 |
| WO | 2009104850 A1 | 8/2009 |

OTHER PUBLICATIONS

International Search Report and Written Opinion—PCT/US2011/025123—ISA/EPO—Dec. 22, 2011.

Hung et al., "On Macroblock Partition for Motion Compensation," Proc. IEEE Intl. Conf. on Image Processing, ICIP, Atlanta, USA, pp. 1697-1700, Oct. 2006.

Muhit et al., "A Fast Approach for Geometry-Adaptive Block Partitioning," Proc. of the 27th Conf on Picture Coding Symposium, May 6-8, 2009, Chicago, IL, 4 pages.

Karczewicz M., et al., "Improved H.264 Intracoding Based on Bi-Directional Intra Prediction, Direcfional Transform, and Adaptive Coefficient Scanning", 15th IEEE International Conference on Image Processing, 2008. ICIP 2008. pp. 2116-2119, Oct. 2008.

Taiwan Search Report—TW100105488—Tipo—Jun. 20, 2013.

\* cited by examiner

SMOOTHING OVERLAPPED REGIONS RESULTING FROM GEOMETRIC MOTION PARTITIONING

This application claims the benefit of U.S. Provisional Application No. 61/305,892, filed Feb. 18, 2010, U.S. Provisional Application No. 61/323,233, filed Apr. 12, 2010, and U.S. Provisional Application No. 61/323,244, filed Apr. 12, 2010, the entire content of each of which is expressly incorporated by reference herein.

CROSS-REFERENCE TO RELATED APPLICATIONS

The present Application for Patent is related to the following co-pending U.S. Patent Application:
"ADAPTIVE TRANSFORM SIZE SELECTION FOR GEOMETRIC MOTION PARTITIONING" by Chen et al., having Ser. No. 13/013,706, filed concurrently herewith, assigned to the assignee hereof, and expressly incorporated by reference herein; "ENCODING MOTION VECTORS FOR GEOMETRIC MOTION PARTITIONING" by Chen et al., having Ser. No. 13/013,715, filed concurrently herewith, assigned to the assignee hereof, and expressly incorporated by reference herein; and "FIXED POINT IMPLEMENTATION FOR GEOMETRIC MOTION PARTITIONING" by Joshi et al., having Ser. No. 13/012,126, filed concurrently herewith, assigned to the assignee hereof, and expressly incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

SUMMARY

In general, this disclosure describes techniques for supporting geometric motion partitioning of video blocks. That is, rather than partitioning a rectangular block into two or more strictly rectangular partitions, the techniques of this disclosure provide for partitioning the block using an arbitrary partition boundary, referred to as geometric motion partitioning. To support geometric motion partitioning, this disclosure provides techniques for performing motion compensation for overlapping portions of the partitions at the partition boundary. This disclosure also provides techniques for adaptively selecting a transform size for sub-blocks of the partitioned block. Furthermore, this disclosure provides techniques for individually encoding motion vectors of the partitions. Moreover, the techniques of this disclosure may be performed using either fixed point or floating point implementations.

In one example, a method includes partitioning a block of video data into a first partition and a second partition using a geometric motion partition line, calculating a prediction value of a pixel in a transition region of the block using a filter that applies a value for at least one neighboring pixel from the first partition and a value for at least one neighboring pixel from the second partition, calculating a residual value of the pixel in the transition region of the block based on the prediction value of the pixel in the transition region, and outputting the residual value of the pixel.

In another example, an apparatus includes a video encoder configured to partition a block of video data into a first partition and a second partition using a geometric motion partition line, calculate a prediction value of a pixel in a transition region of the block using a filter that applies a value for at least one neighboring pixel from the first partition and a value for at least one neighboring pixel from the second partition, calculate a residual value of the pixel in the transition region of the block based on the prediction value of the pixel in the transition region, and output the residual value of the pixel.

In another example, an apparatus includes means for partitioning a block of video data into a first partition and a second partition using a geometric motion partition line, means for calculating a prediction value of a pixel in a transition region of the block using a filter that applies a value for at least one neighboring pixel from the first partition and a value for at least one neighboring pixel from the second partition, means for calculating a residual value of the pixel in the transition region of the block based on the prediction value of the pixel in the transition region, and means for outputting the residual value of the pixel.

In another example, a computer program product comprises a computer readable medium having stored thereon instructions that, when executed, cause a processor to partition a block of video data into a first partition and a second partition using a geometric motion partition line, calculate a prediction value of a pixel in a transition region of the block using a filter that applies a value for at least one neighboring pixel from the first partition and a value for at least one neighboring pixel from the second partition, calculate a residual value of the pixel in the transition region of the block based on the prediction value of the pixel in the transition region, and output the residual value of the pixel.

In another example, a method includes receiving an encoded block of video data, a definition of a geometric motion partition line that partitions the encoded block into a first partition and a second partition, and a residual value for a pixel in a transition region of the block, calculating a prediction value of the pixel in the transition region of the block using a filter that applies a value for at least one neighboring pixel from the first partition and a value for at least one neighboring pixel from the second partition, calculating a reconstructed value for the pixel in the transition region of the block based on the prediction value and the residual value, and outputting the reconstructed value of the pixel.

In another example, an apparatus includes a video decoder configured to receive an encoded block of video data, a definition of a geometric motion partition line that partitions the encoded block into a first partition and a second partition, and a residual value for a pixel in a transition region of the block, calculate a prediction value of the pixel in the transition region of the block using a filter that applies a value for at least one neighboring pixel from the first partition and a value for at least one neighboring pixel from the second partition, calculate a reconstructed value for the pixel in the transition region of the block based on the prediction value and the residual value, and output the reconstructed value of the pixel.

In another example, an apparatus includes means for receiving an encoded block of video data, a definition of a geometric motion partition line that partitions the encoded block into a first partition and a second partition, and a residual value for a pixel in a transition region of the block, means for calculating a prediction value of the pixel in the transition region of the block using a filter that applies a value for at least one neighboring pixel from the first partition and a value for at least one neighboring pixel from the second partition, means for calculating a reconstructed value for the pixel in the transition region of the block based on the prediction value and the residual value, and means for outputting the reconstructed value of the pixel.

In another example, a computer program product comprises a computer readable medium having stored thereon instructions that, when executed, cause a processor to receive an encoded block of video data, a definition of a geometric motion partition line that partitions the encoded block into a first partition and a second partition, and a residual value for a pixel in a transition region of the block, calculate a prediction value of the pixel in the transition region of the block using a filter that applies a value for at least one neighboring pixel from the first partition and a value for at least one neighboring pixel from the second partition, calculate a reconstructed value for the pixel in the transition region of the block based on the prediction value and the residual value, and output the reconstructed value of the pixel.

In another example, a method includes partitioning a block of video data into a first geometric partition and a second geometric partition using a geometric motion partition line, wherein the block comprises N×N pixels, dividing the block of video data into four equally-sized, non-overlapping (N/2)×(N/2) sub-blocks, and encoding at least one of the sub-blocks through which the geometric motion partition line passes using a transform size smaller than (N/2)×(N/2).

In another example, an apparatus includes a video encoder configured to partition a block of video data into a first geometric partition and a second geometric partition using a geometric motion partition line, wherein the block comprises N×N pixels, divide the block of video data into four equally-sized, non-overlapping (N/2)×(N/2) sub-blocks, and encode at least one of the sub-blocks through which the geometric motion partition line passes using a transform size smaller than (N/2)×(N/2).

In another example, an apparatus includes means for partitioning a block of video data into a first geometric partition and a second geometric partition using a geometric motion partition line, wherein the block comprises N×N pixels, means for dividing the block of video data into four equally-sized, non-overlapping (N/2)×(N/2) sub-blocks, and means for encoding at least one of the sub-blocks through which the geometric motion partition line passes using a transform size smaller than (N/2)×(N/2).

In another example, a computer program product comprises a computer readable medium having stored thereon instructions that, when executed, cause a processor to partition a block of video data into a first geometric partition and a second geometric partition using a geometric motion partition line, wherein the block comprises N×N pixels, divide the block of video data into four equally-sized, non-overlapping (N/2)×(N/2) sub-blocks, and encode at least one of the sub-blocks through which the geometric motion partition line passes using a transform size smaller than (N/2)×(N/2).

In another example, a method includes receiving an encoded block of video data partitioned into a first geometric partition and a second geometric partition by a geometric motion partition line, wherein the block comprises N×N pixels, dividing the block of video data into four equally-sized, non-overlapping (N/2)×(N/2) sub-blocks, and inverse transforming at least one of the sub-blocks through which the geometric motion partition line passes using a transform size smaller than (N/2)×(N/2).

In another example, an apparatus includes a video decoder configured to receive an encoded block of video data partitioned into a first geometric partition and a second geometric partition by a geometric motion partition line, wherein the block comprises N×N pixels, divide the block of video data into four equally-sized, non-overlapping (N/2)×(N/2) sub-blocks, and inverse transform at least one of the sub-blocks through which the geometric motion partition line passes using a transform size smaller than (N/2)×(N/2).

In another example, an apparatus includes means for receiving an encoded block of video data partitioned into a first geometric partition and a second geometric partition by a geometric motion partition line, wherein the block comprises N×N pixels, means for dividing the block of video data into four equally-sized, non-overlapping (N/2)×(N/2) sub-blocks, and means for inverse transforming at least one of the sub-blocks through which the geometric motion partition line passes using a transform size smaller than (N/2)×(N/2).

In another example, a computer program product comprises a computer readable medium having stored thereon instructions that, when executed, cause a processor to receive an encoded block of video data partitioned into a first geometric partition and a second geometric partition by a geometric motion partition line, wherein the block comprises N×N pixels, divide the block of video data into four equally-sized, non-overlapping (N/2)×(N/2) sub-blocks, and inverse transform at least one of the sub-blocks through which the geometric motion partition line passes using a transform size smaller than (N/2)×(N/2).

In another example, a method includes partitioning a block of video data into a first partition and a second partition using a geometric motion partition line, determining a first motion vector for the first partition and a second motion vector for the second partition, encoding the first motion vector based on a first motion predictor selected from motion vectors for blocks neighboring the first partition, encoding the second motion vector based on a second motion predictor selected from motion vectors for blocks neighboring the second partition, wherein the blocks neighboring the second partition are determined independently of the blocks neighboring the first partition, and outputting the encoded first and second motion vectors.

In another example, an apparatus includes a video encoder configured to partition a block of video data into a first partition and a second partition using a geometric motion partition line, determine a first motion vector for the first partition and a second motion vector for the second partition, encode the first motion vector based on a first motion predictor selected from motion vectors for blocks neighboring the first partition, encode the second motion vector based on a second motion predictor selected from motion vectors for blocks neighboring the second partition, wherein the blocks neighboring the second partition are determined independently of the blocks neighboring the first partition, and output the encoded first and second motion vectors.

In another example, an apparatus includes means for partitioning a block of video data into a first partition and a second partition using a geometric motion partition line, means for determining a first motion vector for the first partition and a second motion vector for the second partition, means for encoding the first motion vector based on a first motion predictor selected from motion vectors for blocks neighboring the first partition, means for encoding the second motion vector based on a second motion predictor selected from motion vectors for blocks neighboring the second partition, wherein the blocks neighboring the second partition are determined independently of the blocks neighboring the first partition, and means for outputting the encoded first and second motion vectors.

In another example, a computer program product comprises a computer readable medium having stored thereon instructions that, when executed, cause a processor to determine a set of blocks that neighbor the partitioned block, determine a first subset of the set of blocks comprising blocks that neighbor the first partition, and determine a second subset of the set of blocks comprising blocks that neighbor the second partition, independently of determining the first subset.

In another example, a method includes receiving a block of video data partitioned by a geometric motion partition line into a first partition and a second partition, a first encoded motion vector for the first partition, and a second encoded motion vector for the second partition, decoding the first encoded motion vector based on a first motion predictor selected from motion vectors for blocks neighboring the first partition, decoding the second encoded motion vector based on a second motion predictor selected from motion vectors for blocks neighboring the second partition, wherein the blocks neighboring the second partition are determined independently of the blocks neighboring the first partition, and decoding the block using the decoded first and second motion vectors.

In another example, an apparatus includes a video decoder configured to receive a block of video data partitioned by a geometric motion partition line into a first partition and a second partition, a first encoded motion vector for the first partition, and a second encoded motion vector for the second partition, decode the first encoded motion vector based on a first motion predictor selected from motion vectors for blocks neighboring the first partition, decode the second encoded motion vector based on a second motion predictor selected from motion vectors for blocks neighboring the second partition, wherein the blocks neighboring the second partition are determined independently of the blocks neighboring the first partition, and decode the block using the decoded first and second motion vectors.

In another example, an apparatus includes means for receiving a block of video data partitioned by a geometric motion partition line into a first partition and a second partition, a first encoded motion vector for the first partition, and a second encoded motion vector for the second partition, means for decoding the first encoded motion vector based on a first motion predictor selected from motion vectors for blocks neighboring the first partition, means for decoding the second encoded motion vector based on a second motion predictor selected from motion vectors for blocks neighboring the second partition, wherein the blocks neighboring the second partition are determined independently of the blocks neighboring the first partition, and means for decoding the block using the decoded first and second motion vectors.

In another example, a computer program product comprises a computer readable medium having stored thereon instructions that, when executed, cause a processor to receive a block of video data partitioned by a geometric motion partition line into a first partition and a second partition, a first encoded motion vector for the first partition, and a second encoded motion vector for the second partition, decode the first encoded motion vector based on a first motion predictor selected from motion vectors for blocks neighboring the first partition, decode the second encoded motion vector based on a second motion predictor selected from motion vectors for blocks neighboring the second partition, wherein the blocks neighboring the second partition are determined independently of the blocks neighboring the first partition, and decode the block using the decoded first and second motion vectors.

In another example, a method includes partitioning a block of video data into a first partition and a second partition using a geometric motion partition line, calculating a slope value and a y-intercept value of the geometric motion partition line, wherein the slope value and the y-intercept value comprise integer values, calculating a mask indicative of pixels of the block in the first partition and pixels of the block in the second partition, encoding the first partition and the second partition based on the mask, and outputting the encoded first partition, the encoded second partition, the slope value, and the y-intercept value.

In another example, an apparatus includes a video encoder configured to partition a block of video data into a first partition and a second partition using a geometric motion partition line, calculate a slope value and a y-intercept value of the geometric motion partition line, wherein the slope value and the y-intercept value comprise integer values, calculate a mask indicative of pixels of the block in the first partition and pixels of the block in the second partition, encode the first partition and the second partition based on the mask, and output the encoded first partition, the encoded second partition, the slope value, and the y-intercept value.

In another example, an apparatus includes means for partitioning a block of video data into a first partition and a second partition using a geometric motion partition line, means for calculating a slope value and a y-intercept value of the geometric motion partition line, wherein the slope value and the y-intercept value comprise integer values, means for calculating a mask indicative of pixels of the block in the first partition and pixels of the block in the second partition, means for encoding the first partition and the second partition based on the mask, and means for outputting the encoded first partition, the encoded second partition, the slope value, and the y-intercept value.

In another example, a computer program product comprises a computer readable medium having stored thereon instructions that, when executed, cause a processor to partition a block of video data into a first partition and a second partition using a geometric motion partition line, calculate a slope value and a y-intercept value of the geometric motion partition line, wherein the slope value and the y-intercept value comprise integer values, calculate a mask indicative of pixels of the block in the first partition and pixels of the block in the second partition, encode the first partition and the second partition based on the mask, and output the encoded first partition, the encoded second partition, the slope value, and the y-intercept value.

In another example, a method includes receiving an encoded block of video data that has been partitioned into a first partition and a second partition by a geometric motion partition line, receiving a slope value and a y-intercept value defining the geometric motion partition line, wherein the slope value and the y-intercept value comprise integer values, calculating a mask indicative of pixels of the block in the first partition and pixels of the block in the second partition, decoding the first partition and the second partition of the block based on the mask, and outputting the decoded block.

In another example, an apparatus includes a video decoder configured to receive an encoded block of video data that has been partitioned into a first partition and a second partition by a geometric motion partition line, receive a slope value and a y-intercept value defining the geometric motion partition line, wherein the slope value and the y-intercept value comprise integer values, calculate a mask indicative of pixels of the block in the first partition and pixels of the block in the second partition, decode the first partition and the second partition of the block based on the mask, and output the decoded block.

In another example, an apparatus includes means for receiving an encoded block of video data that has been partitioned into a first partition and a second partition by a geometric motion partition line, means for receiving a slope value and a y-intercept value defining the geometric motion partition line, wherein the slope value and the y-intercept value comprise integer values, means for calculating a mask indicative of pixels of the block in the first partition and pixels of the block in the second partition, means for decoding the first partition and the second partition of the block based on the mask, and means for outputting the decoded block.

In another example, a computer program product comprises a computer readable medium having stored thereon instructions that, when executed, cause a processor to receive an encoded block of video data that has been partitioned into a first partition and a second partition by a geometric motion partition line, receive a slope value and a y-intercept value defining the geometric motion partition line, wherein the slope value and the y-intercept value comprise integer values, calculate a mask indicative of pixels of the block in the first partition and pixels of the block in the second partition, decode the first partition and the second partition of the block based on the mask, and output the decoded block.

The details of one or more examples are set forth in the accompanying drawings and the description below. Other features, objects, and advantages will be apparent from the description and drawings, and from the claims.

DETAILED DESCRIPTION

Figure 1:
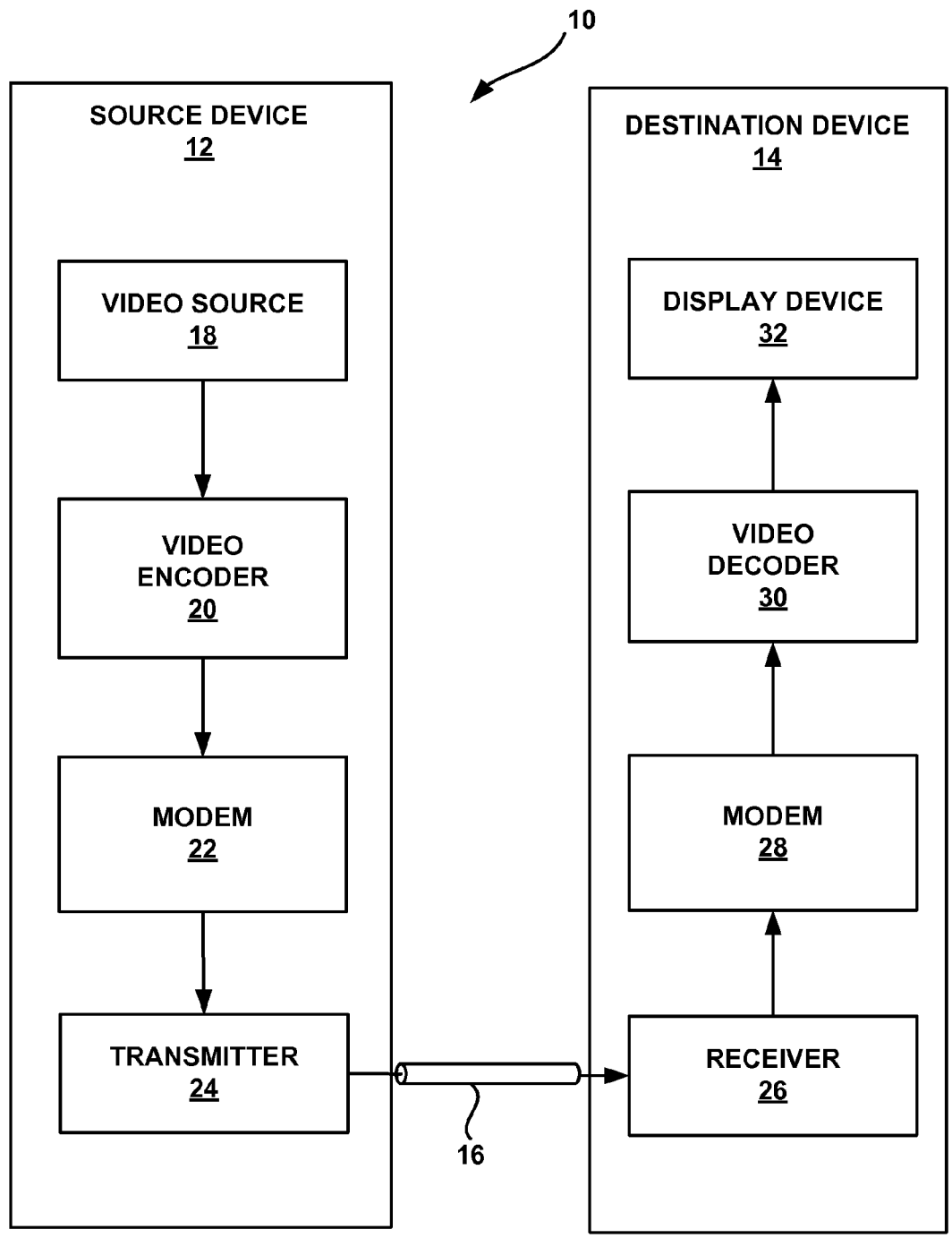
FIG. 1 is a block diagram illustrating an example video encoding and decoding system that may utilize techniques for geometric motion partitioning.

In general, this disclosure describes techniques for supporting geometric motion partitioning of video blocks. That is, rather than partitioning a rectangular block into two or more strictly rectangular partitions, the techniques of this disclosure provide for partitioning the block using an arbitrary partition boundary, referred to as geometric motion partitioning. The partition line may be defined using two parameters: the length ρ (rho) of the line segment perpendicular to the partition line and originating at the center point of the partitioned block, and the angle of the perpendicular line relative to a horizontal line passing through the center point of the partitioned block θ (theta). In some examples, the partition line may be realized by a stepped line that demarcates pixels of each partition, such that the partition line does not pass through any pixels of the block.

For purposes of example and explanation, this disclosure describes techniques for geometric motion partitioning of a macroblock. It should be understood, however, that these techniques may generally be applied to partition any block of video data. The term macroblock refers to a data structure for coding digital picture and video data using a two-dimensional pixel array, typically having a size of 16×16 pixels. A macroblock may include chrominance data and luminance data. Typically, the chrominance data is downsampled relative to the luminance data by a factor of two, horizontally and vertically. Thus, a macroblock may include four luminance blocks and two chrominance blocks. Each of the four luminance blocks may comprise 8×8 pixels, and each corner of the macroblock may be touched by the corner of exactly one of the luminance blocks. The two chrominance blocks may be 8×8 pixel blocks such that the corners of each of the chrominance blocks touch the respective corners of the macroblock. Thus, the chrominance blocks may overlap each other and the luminance blocks.

Video coding standards typically provide various prediction modes for encoding a block of video data. Intra-prediction involves encoding a block of a slice or frame relative to other blocks of the same slice or frame. Inter-prediction allows for encoding a block of a slice or frame relative to one or more other slices or frames, using motion estimation and motion compensation techniques.

The techniques of this disclosure, which are generally directed to geometric motion partitioning, may allow arbitrary partition sizes and shapes. That is, a partition line defined using the rho and theta values described above may allow non-rectangular partitions to be used to encode a macroblock. In particular, the techniques of this disclosure describe techniques for producing motion vectors for the geometric motion partitions, and for performing motion compensation based on the geometric motion partitions. A geometric motion partition line is not limited to partitioning a block into rectangular partitions. While in some examples a geometric motion partition line may partition an N×N block into an N×M block, geometric motion partitioning also offers the ability to partition a block into non-rectangular partitions such as, e.g., a triangular partition. In this manner, a geometric motion partition line may intersect one horizontal boundary of a block and one vertical boundary of the block.

In some examples, supporting geometric motion partitioning includes the use of modified motion compensation techniques. In particular, the modified motion compensation techniques may provide a smoothing filter for pixels in a transition region near the geometric motion partition line. The motion compensation techniques of this disclosure may include determining residual values for such overlapping pixels. In one example, the techniques of this disclosure define a low-pass filter (e.g., a smoothing filter) to perform motion compensation in this boundary region. That is, various filters may be defined that smooth the transition between the partitions at the geometry partition line. If a pixel falls within the transition region, motion compensation for that pixel may be performed by applying one of these filters to determine a prediction value for the pixel, where the filter applies values from prediction blocks identified by motion vectors for the partitions, and then determining the difference between the prediction value and the value of the pixel to be encoded. This difference may represent the residual value for the pixel.

In another example, to perform motion compensation at the boundary region of a geometrically partitioned block, a weighted average may be used. That is, to determine the motion compensated value for a pixel, a weighted average of the values for the pixel from the two partitions may be calculated. The value for the partition to which the pixel is relatively closer may be weighted more heavily than the value for the other partition. The predicted value for a pixel may be calculated in this manner, then used to calculate a residual value, or to reconstruct an encoded block by applying a received residual value to the predicted value.

This disclosure also includes techniques for encoding a residual of a block partitioned using a geometric motion partition. To encode the residual of a block with a geometric partition, an adaptive transform size may be used, based on the position of the partition line. In general, for each sub-block block of N×N pixels, the residual for the sub-block may be encoded using an N×N transform size if the partition does not cross through the block; otherwise, the N×N sub-block may be sub-divided into N/2×N/2 sub-blocks, each of which may be re-analyzed as to whether the partition line crosses through the sub-blocks.

For example, suppose the block size is 16×16. For each 8×8 sub-block inside, an 8×8 transform may be used if all pixels inside the 8×8 block belong to the same partition, otherwise four 4×4 transforms may be used. As another example, when the block size is 32×32 or 64×64, for each 32×32 or 16×16 inner sub-block, a 16×16 transform may be used if all pixels inside the 16×16 block belong to the same partition, otherwise the logic may be repeated for each 16×16 sub-block.

This disclosure further provides techniques for encoding motion vectors for partitions of a block partitioned using a geometric motion partition line. These techniques may include selecting motion predictors for the motion vectors, and the candidates for the motion predictors may be different for the motion vectors of two partitions of the same block. The candidates for the motion predictors may also include more potential motion predictors than those for conventional encoding standards.

The techniques of this disclosure can also be applied in a fixed point implementation. In particular, the geometric motion partition line can be defined using fixed point (e.g., integer) values representative of a slope (m) and a y-intercept (c) of the line. An encoder and a decoder may each be configured to use fixed point arithmetic to evaluate a geometric motion partition, such that the encoder and the decoder create identical masks from the fixed point values. The encoder and decoder may be configured to calculate the mask as follows: for each point (x, y) of the mask, the value of the point at (x, y) in the mask is 1 if y−m*x<c, and the value of the point at (x, y) in the mask is 0 if y−m*x>=c. In this manner, the encoder and decoder may be configured to calculate the mask (comprising a set of points defined by respective x-values and y-values) such that, for each point in the mask, the value of the point in the mask is set to a value indicative of whether the difference between the y-value of the point and the product of the slope value of the line and the x-value of the point is greater than the y-intercept value of the line. The value of each point in the mask may comprise a one-bit value.

Points in the mask having a value of 0 correspond to region zero, while points in the mask having a value of 1 correspond to region one. Region zero may be one partition and region one may be another partition, as defined by the geometric motion partition. Thus, rather than calculating masks from the angle θ (theta) and distance ρ (rho) to the center point of the geometric motion partition using floating point arithmetic, the encoder and decoder may be configured to calculate the masks using fixed point, integer values for slope m and y-intercept c based on the angle and center point values. The techniques of this disclosure also may include signaling whether geometric motion partitioning is used for a particular block or set of blocks, and if so, whether fixed point or floating point operations are to be used for the block or set of blocks.

FIG. 1 is a block diagram illustrating an example video encoding and decoding system 10 that may utilize techniques for geometric motion partitioning. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless. The techniques of this disclosure, however, which concern geometric motion partitioning, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for geometric motion partitioning. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for geometric motion partitioning may be performed by any digital video encoding and/or decoding device. Although generally the techniques of this disclosure are performed by a video encoding device, the techniques may also be performed by a video encoder/decoder, typically referred to as a "CODEC." Moreover, certain aspects of the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to geometric motion partitioning. The information communicated over channel 16 may include syntax information defined by video encoder 20, which is also used by video decoder 30, that includes syntax elements that describe characteristics and/or processing of macroblocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames, also referred to as video pictures. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a macroblock, a partition of a macroblock, or a block larger than a macroblock. The video blocks may have fixed or varying sizes, and may differ in size according to a specified coding standard. Each video frame may include one or more slices. Each slice may include a plurality of macroblocks, which may be arranged into partitions, also referred to as sub-blocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

In accordance with the techniques of this disclosure, video encoder 20 may be configured to use geometric motion partitioning during inter-mode encoding of a block, e.g., a macroblock. That is, video encoder 20 may determine that the block can be best encoded using a geometric motion partition line, also referred to as a geometry partition. The origin is assumed to be at the center of the block. Then, each geometric motion partition line is defined by a line passing through the origin that is perpendicular to the line defining the partition boundary. That is, video encoder 20 may define the geometric motion partition line using two parameters: the length ρ (rho) of the line segment perpendicular to the partition line and originating at the center point of the partitioned block, and the angle θ (theta) of the perpendicular line relative to a horizontal line passing through the center point of the partitioned block. In other words, the geometric motion partition line is defined by the angle subtended by the perpendicular line with the X-axis and the distance of the partition line from the origin. Video encoder 20 may be configured to determine that a block should be partitioned into two partitions, and to calculate a partition line defined according to (ρ, θ) that best fits the division between the two partitions. Equation (1) below defines a geometric motion partition line:

$$y = \frac{-1}{\tan(\theta)}x + \frac{\rho}{\sin(\theta)} = mx + c. \quad (1)$$

In various examples, video encoder 20 may be configured to use blocks of a fixed or variable size, such as, for example, 16×16, 32×32, and/or 64×64 blocks. In general, for an N×N block, video encoder 20 may select a value for ρ in the range of [0, (N/2)−1], inclusive. Thus, for a 16×16 block, video encoder 20 may be configured to select a value for ρ in the range of [0, 7], inclusive. As another example, for a 32×32 block, video encoder 20 may be configured to select a value for ρ in the range of [0, 15], inclusive. As yet another example, for a 64×64 block, video encoder 20 may be configured to select a value for ρ in the range of [0, 31], inclusive. In some examples, video encoder 20 may be configured to select a value for θ in the range of [0, 31], inclusive. Thus, the range of values for θ may have a step size of 11.25 degrees. In these examples, there may be 256 possible geometry partitions for block sizes of 16×16, 512 possible geometry partitions for block sizes of 32×32, and 1024 possible geometry partitions for block sizes of 64×64. However, the block size and selection of step size of ρ and θ are not necessarily limited to the values mentioned above.

Video encoder 20 and video decoder 30 may be configured to determine to which geometric motion partition a particular pixel corresponds, and should be configured such that both the encoder and decoder select the same partition for a given pixel. In some examples, video encoder 20 and video decoder 30 may use fixed point calculations when partitioning a block using a geometric motion partition. Indications of whether pixels correspond to region zero or region one can be efficiently stored as a binary mask with zero indicating that a pixel belongs to region zero and one indicating that the pixel belongs to region one. Due to the number of possible geometry partitions and block sizes, it may be prohibitive to store all the masks at video encoder 20 and video decoder 30. Thus, this disclosure includes techniques for calculating the masks on the fly, and in some examples, using fixed point arithmetic.

Slope m and y-intercept c in formula (1) contain trigonometric functions, and thus calculation of the masks on the fly based strictly on this formula would require a floating point implementation. In some cases, it is difficult or even impossible for two devices to have matching floating point implementations. Accordingly, the masks may be calculated using fixed point arithmetic. Thus, calculating a prediction value for a pixel in the transition region may include calculating a mask indicative of pixels of the block in the first partition and pixels of the block in the second partition, and locating at least one neighboring pixel to the pixel in the transition region in the first partition and at least one neighboring pixel in the second partition based on the mask, using fixed point arithmetic.

In examples using fixed point arithmetic, cases where θ=0 and θ=π may be excluded, as the geometric motion partition would be a vertical line with infinite slope and infinite y-intercept. For remaining cases, 1/tan θ and 1/sin θ may be represented using fixed point values. The other parameter, ρ, may already be expressed as an integer. For 1/tan θ, the maximum absolute value for the remaining values of θ is 5.0273 and the maximum absolute difference between two consecutive values of 1/tan θ may be 0.1989. Similarly, for 1/sin θ, the maximum absolute value may be 5.1258, and the maximum absolute difference between two consecutive values of 1/sin θ may be 0.0196. To convert the mask calculation into a fixed point operation, video encoder 20 may multiply 1/tan θ and 1/sin θ by a suitable power of 2 and round the results to the nearest integer.

In one example, for fixed point implementation, a video encoder 20 may multiply the 1/tan θ and 1/sin θ by $2^{20}$, or 1048576, and round them to the nearest integers. Since the maximum value of ρ is 32 in the example of a block size up to 64×64 with a step size of 1, a 25-bit signed implementation is adequate for representing the y-intercept value. Because x, in the expression "mx," can take values from −32 to 31, mx can also be represented as a 25-bit signed integer. In some examples, video encoder 20 and video decoder 30 may use 32-bit, signed integers to store values of 1/tan θ and 1/sin θ, for each of 32 values of θ. Due to the symmetric properties of the sin and tan functions, video encoder 20 and video decoder 30 may be configured to store only 8 values of slopes and intercepts as 32-bit signed integers. As indicated earlier, these stored values do not need to be used when θ=0 and θ=π.

Video encoder 20 and video decoder 30 may be configured to derive identical masks using fixed point operations. This may avoid causing drift error between video encoder 20 and video decoder 30, which may otherwise be caused by geometric motion partitioning. Let region zero be defined such that for any point $(x_0, y_0)$ in region 0, $y_0-m^*x_0 >= c$. Similarly, let region one be defined such that for any point $(x_1, y_1)$ in region 1, $y_1-m^*x_1 < c$. For any geometric motion partition, and any point (x, y), video encoder 20 may calculate $y-m^*x$ in fixed point and compare the result with the y-intercept to determine whether the point belongs to region zero or region one. When θ=0 or θ=π, the geometric motion partition is a vertical line defined by x=ρ. In that case all points from the block with x<ρ may be defined to belong to partition 0 and the remaining points (x>=ρ) may be defined to belong to partition 1. Video encoder 20 and video decoder 30 may be configured to iterate through each point in a block to calculate a mask for the block indicating which points correspond to region zero and which points correspond to region one. After calculating the mask for a block using fixed point operations, remaining computations for geometry based motion partition may be based on the mask.

In this manner, video encoder 20 may correspond to an example of a video encoder configured to partition a block of video data into a first partition and a second partition using a geometric motion partition line, calculate a slope value and a y-intercept value of the geometric motion partition line, wherein the slope value and the y-intercept value comprise integer values, calculate a mask indicative of pixels of the block in the first partition and pixels of the block in the second partition, encode the first partition and the second partition based on the mask, and output the encoded first partition, the encoded second partition, the slope value, and the y-intercept value.

Partitioning of the block using a geometric motion partition may produce two nonrectangular partitions of the block, each having a respective motion vector. The partitions may correspond to prediction values for the block being encoded. Video encoder 20 may also encode the motion vectors for the geometric motion partitions. Video encoder 20 may encode motion vectors relative to a motion predictor. Video encoder 20 may select the motion predictor as the median of the motion vectors of neighboring blocks that have already been encoded, e.g., blocks above, to the left of, and above-right of the current block, assuming a raster scan ordering when encoding the blocks. The techniques of this disclosure include selecting the median from a broader set of candidate motion vectors than are used in conventional coding standards, and using potentially different candidate motion vectors for each motion vector of the block. That is, video encoder 20 may determine to use different motion predictors for the motion vectors of the geometric motion partitions of a single block.

In addition, video encoder 20 calculates residual values for the block. In general, a residual value for a pixel of the block corresponds to the difference between the actual value for the pixel of the block and the prediction value for the collocated pixel of the block. In one example, the techniques of this disclosure include smoothing the transition across the geometric motion partition line. To do so, video encoder 20 may be configured with a particular transition region around the partition line. As an example, video encoder 20 may be configured to use a 3×3 pixel window centered on a current pixel. As an example, video encoder 20 may be configured to determine that the current pixel is in the transition region if at least two of the immediate upper, lower, left, and right pixels belong to different partitions. As another example, video encoder 20 may be configured to determine that the current pixel is in the transition region if at least two of the immediate eight neighboring pixels belong to different partitions. In other examples, these schemes can be extended to different sizes of windows centered around a current pixel in which pixels are considered in determining whether the current pixel belongs in the transition region.

To smooth the transition, video encoder 20 may be configured to apply a low pass filter across the partition line. The filter may correspond to a matrix, e.g., a 3×3 matrix, of coefficients centered on a pixel to be filtered. Thus, the filter may be centered on the pixel in the transition region. The low pass filter may have various coefficients. One example of a low pass filter may be:

$$\begin{matrix} 1 & 2 & 1 \\ 2 & 3 & 2 \\ 1 & 2 & 1, \end{matrix}$$

where the '3' coefficient corresponds to the current pixel, and the other coefficients correspond to the other immediate neighboring pixels to the current pixel. Another example of a low pass filter may be:

$$\begin{matrix} 0 & 1 & 0 \\ 1 & 4 & 1 \\ 0 & 1 & 0, \end{matrix}$$

where the '4' coefficient corresponds to the current pixel, and the other coefficients correspond to the other immediate neighboring pixels to the current pixel. To calculate a prediction value for the pixel in the transition region, video encoder 20 may calculate products of the coefficients of the filter and values of pixels collocated with the coefficients (when the filter is centered on the pixel in the transition region), calculate the sum of the products, and divide the sum of the products by the sum of the coefficients.

In this manner, video encoder 20 corresponds to an example of a video encoder configured to partition a block of video data into a first partition and a second partition using a geometric motion partition line, calculate a prediction value of a pixel in a transition region of the block using a filter that applies a value for at least one neighboring pixel from the first partition and a value for at least one neighboring pixel from the second partition, calculate a residual value of the pixel in the transition region of the block based on the prediction value of the pixel in the transition region, and output the residual value of the pixel.

In some examples, for smoothing in the transition region, video encoder 20 selectively performs filtering based on various conditions centered on a current pixel. The conditions may include difference of pixel values (or a certain form of gradient) along a direction perpendicular to the partition line, motion vector difference between the two partitions of the block, partition line direction, reference frame indexes, quantization parameters, and number of pixels of the two partitions. Other conditions may also be analyzed to determine whether and how to filter the pixels in the transition region.

Another method for improving visual quality includes overlapping two predictions for pixels inside the transition region. Video encoder 20 may generate two predictions for pixels belonging to the transition region, using each motion vector for the partitions of the block. Video encoder 20 may then combine the two predictions using a weighted sum. For example, if a pixel belongs to partition one and is also in the transition region, video encoder 20 may weight the prediction value from the first partition value using a weight of ⅔, and a weight of ⅓ for the prediction value from the other partition. Other weight values such as (¾, ¼) or (½,½) may be applied in other examples. In some examples, the weight values may be determined adaptively.

In some examples, the weighting coefficients for the weighted sum operation are determined based on various conditions centered on a current pixel. The conditions may include difference of pixel values (or a certain form of gradient) along a direction perpendicular to the partition line, motion vector difference between the two partitions of the block, partition line direction, reference frame indexes, quantization parameters, and number of pixels of the two partitions. Other conditions may also be analyzed to determine whether and how to filter the pixels in the transition region.

Video encoder 20 may apply a transform to the residual value, such as a discrete cosine transform, 4×4 integer transform, 8×8 transform, 16×16 transform, or other transform. In one example, video encoder 20 may adaptively select a transform size for the residual of a partition of the block, based on whether the geometric motion partition line passes through the partition. In this instance, the term partition refers to an (N/2)×(N/2) or smaller partition of an N×N block, as opposed to a geometric motion partition.

As an example, suppose an N×N block is partitioned using a geometric motion partition line. Video encoder 20 may divide the N×N block into four non-overlapping (N/2)×(N/2) blocks. Then for each (N/2)×(N/2) block, video encoder 20 may determine whether the geometric motion partition passes through the (N/2)×(N/2). If the geometric motion partition line does not pass through the (N/2)×(N/2) block, video encoder 20 may use a transform size of (N/2)×(N/2) for the block. On the other hand, if the geometric motion partition line passes through the (N/2)×(N/2), video encoder 20 may perform the method recursively: dividing the (N/2)×(N/2) into four non-overlapping (N/4)×(N/4) blocks and determining whether the geometric motion partition line passes through any of the (N/4)×(N/4) blocks. Video encoder 20 may be configured with a minimum transform size, e.g., 4×4, at which point video encoder 20 may select the minimum transform size for a sub-block regardless of whether the geometric motion partition line passes through the sub-block.

In this manner, video encoder 20 may correspond to an example of a video encoder configured to partition a block of video data into a first geometric partition and a second geometric partition using a geometric motion partition line, wherein the block comprises N×N pixels, divide the block of video data into four equally-sized, non-overlapping (N/2)×(N/2) sub-blocks, and encode at least one of the sub-blocks through which the geometric motion partition line passes using a transform size smaller than (N/2)×(N/2).

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Video encoder 20 may further send syntax data, such as block-based syntax data, frame-based syntax data, and GOP-based syntax data, to video decoder 30, e.g., in a frame header, a block header, a slice header, or a GOP header. For example, where video encoder 20 provides integers for angle and length values that define a geometric motion partition, to allow for fixed point arithmetic, video encoder 20 may signal the use of integers. Video encoder 20 may signal this in a sequence parameter set or a picture parameter set. Alternatively, video encoder 20 may use a redefined set of profiles and/or levels, and thus may select a profile indicator (profile_idc) or level indicator (level_idc) value indicative of the use of integer values to allow for fixed point arithmetic with respect to the geometric motion partition. Video encoder 20 may also signal whether geometric motion partitions are enabled for a sequence of pictures and/or individual pictures.

Moreover, video encoder 20 may signal whether smoothing has been enabled for a block, and if so, how the smoothing is accomplished, e.g., an indication of a smoothing filter. For example, video encoder 20 may signal the coefficients of the smoothing filter. Video encoder 20 may also signal whether adaptive transform size selection is enabled. Video encoder 20 may also signal whether the extended set of candidate motion vectors is permitted for a picture, to encode a motion vector relative to a motion predictor.

Video decoder 30 may be configured to use the techniques of this disclosure when decoding received video data. The techniques applied by video decoder 30 may essentially be symmetrical to those applied by video encoder 20. For example, video decoder 30 may receive fixed point values for a slope and intercept defining a geometric motion partition for an encoded block, in order to achieve a fixed point implementation of these techniques. Thus, video decoder 30 may calculate a mask for the block on the fly, based on the slope and intercept of the geometric motion partition, iterating through each pixel location for the block to determine whether the pixel falls into region zero or region one.

In this manner, video decoder 30 may correspond to an example of a video decoder configured to receive an encoded block of video data that has been partitioned into a first partition and a second partition by a geometric motion partition line, receive a slope value and a y-intercept value defining the geometric motion partition line, wherein the slope value and the y-intercept value comprise integer values, calculate a mask indicative of pixels of the block in the first partition and pixels of the block in the second partition, decode the first partition and the second partition of the block based on the mask, and output the decoded block.

As another example, video decoder 30 may implement smoothing techniques to smooth the transition region of a block at a geometric motion partition line for the block. Video decoder 30 may receive motion vectors for each geometric motion partition of the block to determine prediction values for pixels of the block. Video decoder 30 may apply a smoothing filter to pixels in the geometric motion partition transition region, as described above. Thus, video decoder 30 may correspond to an example of a video decoder configured to receive an encoded block of video data, a definition of a geometric motion partition line that partitions the encoded block into a first partition and a second partition, and a residual value for a pixel in a transition region of the block, calculate a prediction value of the pixel in the transition region of the block using a filter that applies a value for at least one neighboring pixel from the first partition and a value for at least one neighboring pixel from the second partition, calculate a reconstructed value for the pixel in the transition region of the block based on the prediction value and the residual value, and output the reconstructed value of the pixel.

As yet another example, video decoder 30 may receive keywords for residual values of various sizes, based on adaptive transform size selection. These keywords, which may correspond to variable length codes, may correspond to different dictionaries, based on the transform size for the blocks. Thus, video decoder 30 may determine a transform size for a particular block based on whether the geometric motion partition line passes through the block. In this manner, video decoder 30 may correspond to an example of a video decoder configured to receive an encoded block of video data partitioned into a first geometric partition and a second geometric partition by a geometric motion partition line, wherein the block comprises N×N pixels, divide the block of video data into four equally-sized, non-overlapping (N/2)×(N/2) sub-blocks, and inverse transform at least one of the sub-blocks through which the geometric motion partition line passes using a transform size smaller than (N/2)×(N/2).

As still another example, video decoder 30 may decode motion vectors for the geometric motion partitions relative to motion predictors. In accordance with the techniques of this disclosure, video decoder 30 may determine the motion predictors from a larger set of candidate motion vectors, and may determine the motion predictors for each geometry partition individually. In this manner, video decoder 30 may correspond to an example of a video decoder configured to receive a block of video data partitioned by a geometric motion partition line into a first partition and a second partition, a first encoded motion vector for the first partition, and a second encoded motion vector for the second partition, decode the first encoded motion vector based on a first motion predictor selected from motion vectors for blocks neighboring the first partition, decode the second encoded motion vector based on a second motion predictor selected from motion vectors for blocks neighboring the second partition, wherein the blocks neighboring the second partition are determined independently of the blocks neighboring the first partition, and decode the block using the decoded first and second motion vectors.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Video encoder 20 and video decoder 30 may be configured to perform any combination of the techniques of this disclosure. That is, video encoder 20 and video decoder 30 may be configured to perform any one or more of a fixed point implementation for geometric motion partitioning, smoothing of a transition region defined by a geometric motion partition boundary, encoding motion vectors for each geometric motion partition, and/or adaptive transform size selection for sub-blocks based on whether the geometric motion partition line passes through the sub-blocks, in any combination.

In some examples, although video encoder 20 and video decoder 30 may implement certain techniques described in this disclosure, the techniques may be disabled, or one of video encoder 20 and video decoder 30 may not support the same set of techniques. Accordingly, video encoder 20 may signal which techniques are used for a particular video stream, and video decoder 30 may select whether or not to retrieve or use the video stream, based on whether video decoder 30 supports the techniques used to encode the video stream. For example, video encoder 20 may signal which techniques are used in a sequence parameter set, a picture parameter set, using a profile indicator (profile_idc value), a level indicator (level_idc value), header data, or other descriptive data.

Figure 2:
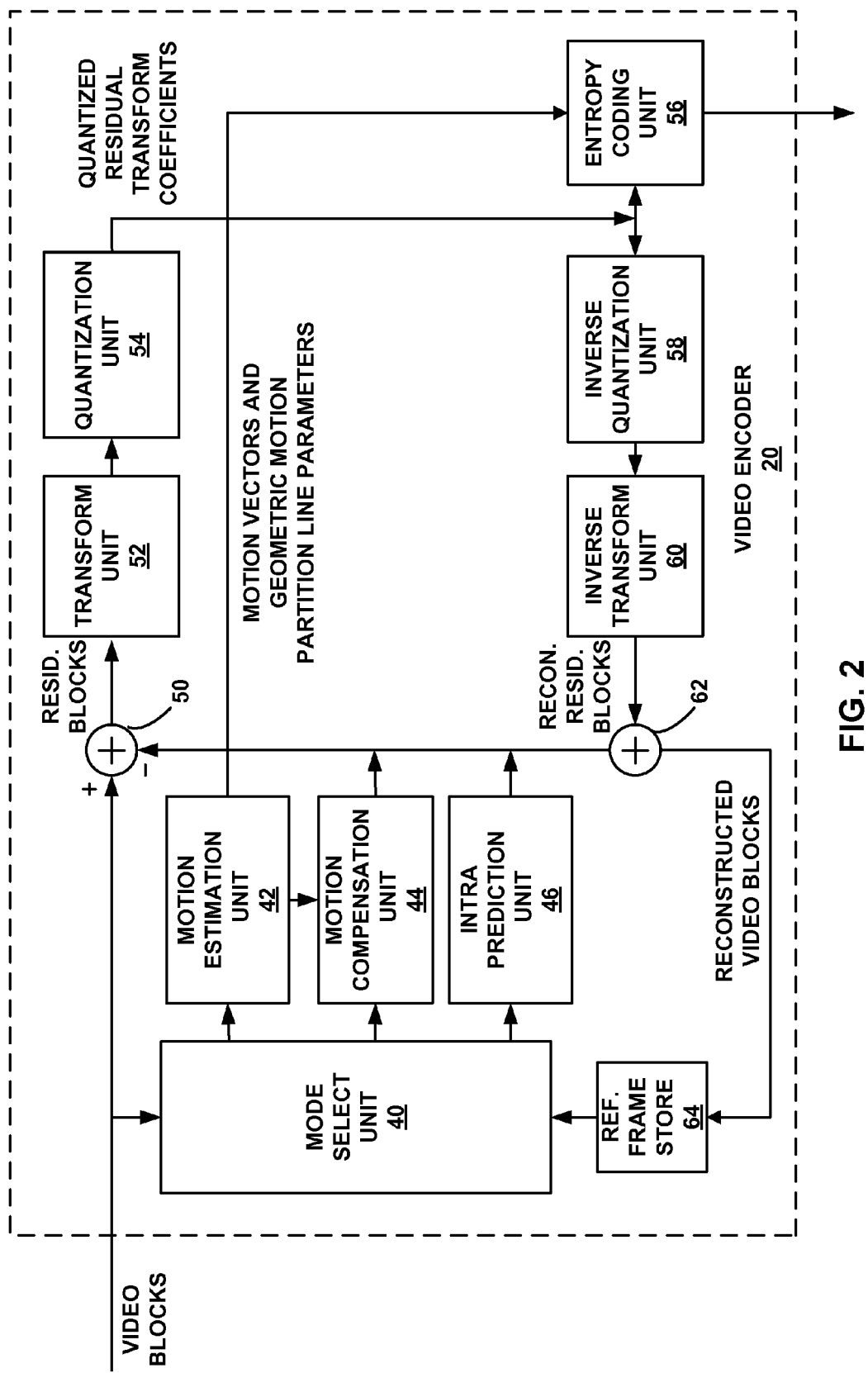
FIG. 2 is a block diagram illustrating an example of video encoder that may implement techniques for geometric motion partitioning.

FIG. 2 is a block diagram illustrating an example of video encoder 20 that may implement techniques for geometric motion partitioning. Video encoder 20 may perform intra- and inter-coding of blocks within video frames, including macroblocks, or partitions or sub-partitions of macroblocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes. Although components for inter-mode encoding are depicted in FIG. 2, it should be understood that video encoder 20 may further include components for intra-mode encoding. However, such components are not illustrated for the sake of brevity and clarity.

As shown in FIG. 2, video encoder 20 receives a current video block within a video frame to be encoded. In the example of FIG. 2, video encoder 20 includes mode select unit 40, motion estimation unit 42, motion compensation unit 44, intra prediction unit 46, reference frame store 64, summer 50, transform unit 52, quantization unit 54, and entropy coding unit 56. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. An intra prediction unit may also perform intra-predictive coding of the received video block relative to one or more neighboring blocks in the same frame or slice as the block to be coded to provide spatial compression.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

In some examples, motion estimation unit 42 may determine that a block should be partitioned using a geometric motion partition line. Motion estimation unit 42 may calculate the parameters for the geometric motion partition line, e.g., angle $\theta$ and distance $\rho$ of a line from the origin of the partitioned block to the midpoint of the geometric motion partition line. In some examples, motion estimation unit 42 may determine the parameters as the slope m and y-intercept c of the geometric motion partition line, in order to allow for a fixed point implementation of these techniques. In addition, video encoder 20 and video decoder 30 (FIGS. 1 and 3) may store identical copies of look-up tables for 1/tan ($\theta$) and 1/sin ($\theta$) for different values of $\theta$. For a geometry mode, video encoder 20 may signal values for $\theta$ and $\rho$ in the output bitstream. Video decoder 30 may be configured to use the signaled values to perform fixed point calculations to calculate a mask that is the same as the mask calculated by video encoder 20.

Motion estimation unit 42 calculates a motion vector for the video block, or a geometric motion partition thereof, of an inter-coded frame by comparing the video block to video blocks (or partitions) of a reference frame in reference frame store 64. Motion compensation unit 44 may also interpolate sub-integer pixels of the reference frame, e.g., an I-frame or a P-frame. The ITU H.264 standard refers to reference frames as "lists." Therefore, data stored in reference frame store 64 may be stored in the lists. Motion estimation unit 42 compares blocks of one or more reference frames from reference frame store 64 to a block to be encoded of a current frame, e.g., a P-frame or a B-frame. When the reference frames in reference frame store 64 include values for sub-integer pixels, a motion vector calculated by motion estimation unit 42 may refer to a sub-integer pixel location of a reference frame.

In some examples, motion estimation unit 42 may calculate a difference between a motion vector and a motion predictor, in order to encode the motion vector. Motion estimation unit 42 may select the motion predictor as the median of the motion vectors of blocks above, to the left of, above and to the left of, and above and to the right of the current block being encoded. Motion estimation unit 42 may also determine whether the blocks above and to the left of the current block have been partitioned, and if so, whether these partitions have distinct motion vectors. If so, motion estimation unit 42 may select the motion predictor from the median of all of these candidate motion vectors. After determining the motion predictor, motion estimation unit 42 may calculate the difference between the motion vector and the motion predictor. Motion estimation unit 42 sends the calculated difference to entropy coding unit 56 and the calculated motion vector to motion compensation unit 44.

Motion compensation unit 44 may calculate prediction data based on the predictive block. Video encoder 20 forms a residual video block by subtracting the prediction data from motion compensation unit 44 from the original video block being coded. Summer 50 represents the component or components that perform this subtraction operation.

In some examples, motion compensation unit 44 may filter pixels in a block at a transition region defined by a geometric motion partition line for the block, in accordance with the techniques of this disclosure. For example, motion compensation unit 44 may calculate prediction values for pixels in the transition region using a 3×3 pixel filter that takes account of values from both region zero and region one, where region zero and region one correspond to geometric motion partitions. As another example, motion compensation unit 44 may calculate prediction values for pixels in the transition region by calculating a weighted sum of the value for the pixel in region zero and the value for the pixel in region one. After calculating a prediction value for a pixel in the transition region, summer 50 may calculate a residual value for the pixel as the difference between the prediction value and the actual value of the pixel. In this manner, the residual value calculated by summer 50 may be based on the smoothed prediction values calculated by motion compensation unit 44.

Transform unit 52 applies a transform, such as a discrete cosine transform (DCT) or a conceptually similar transform, to the residual block, producing a video block comprising residual transform coefficient values. Transform unit 52 may perform other transforms, such as those defined by the H.264 standard, which are conceptually similar to DCT. Wavelet transforms, integer transforms, sub-band transforms or other types of transforms could also be used. In any case, transform unit 52 applies the transform to the residual block, producing a block of residual transform coefficients. The transform may convert the residual information from a pixel value domain to a transform domain, such as a frequency domain.

In some examples, transform unit 52 may receive blocks of various sizes from motion compensation unit 44. Motion compensation unit 44 may be configured to select a block size based on whether the block touches the geometric motion partition line. For example, suppose the original block is a 16×16 block. Motion compensation unit 44 may divide the original block into four 8×8 blocks. Then, motion compensation unit 44 may divide any of the four 8×8 blocks that touch the geometric motion partition line into 4×4 blocks. Transform unit 52 may be configured with transforms for each potential block size. In this manner, video encoder 20 may perform an adaptive transform size selection for geometric motion partitioned blocks when calculating residual values for the blocks. Although the example of a 16×16 block is described, similar techniques may be applied to other size blocks, e.g., 32×32, 64×64, etc. Moreover, motion compensation unit 44 may be configured with a minimum block size, e.g., 4×4.

Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring macroblocks.

In some cases, entropy coding unit 56 or another unit of video encoder 20 may be configured to perform other coding functions, in addition to entropy coding. For example, entropy coding unit 56 may be configured to determine the CBP values for the macroblocks and partitions. Also, in some cases, entropy coding unit 56 may perform run length coding of the coefficients in a macroblock or partition thereof In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-code a block in a subsequent video frame.

Figure 3:
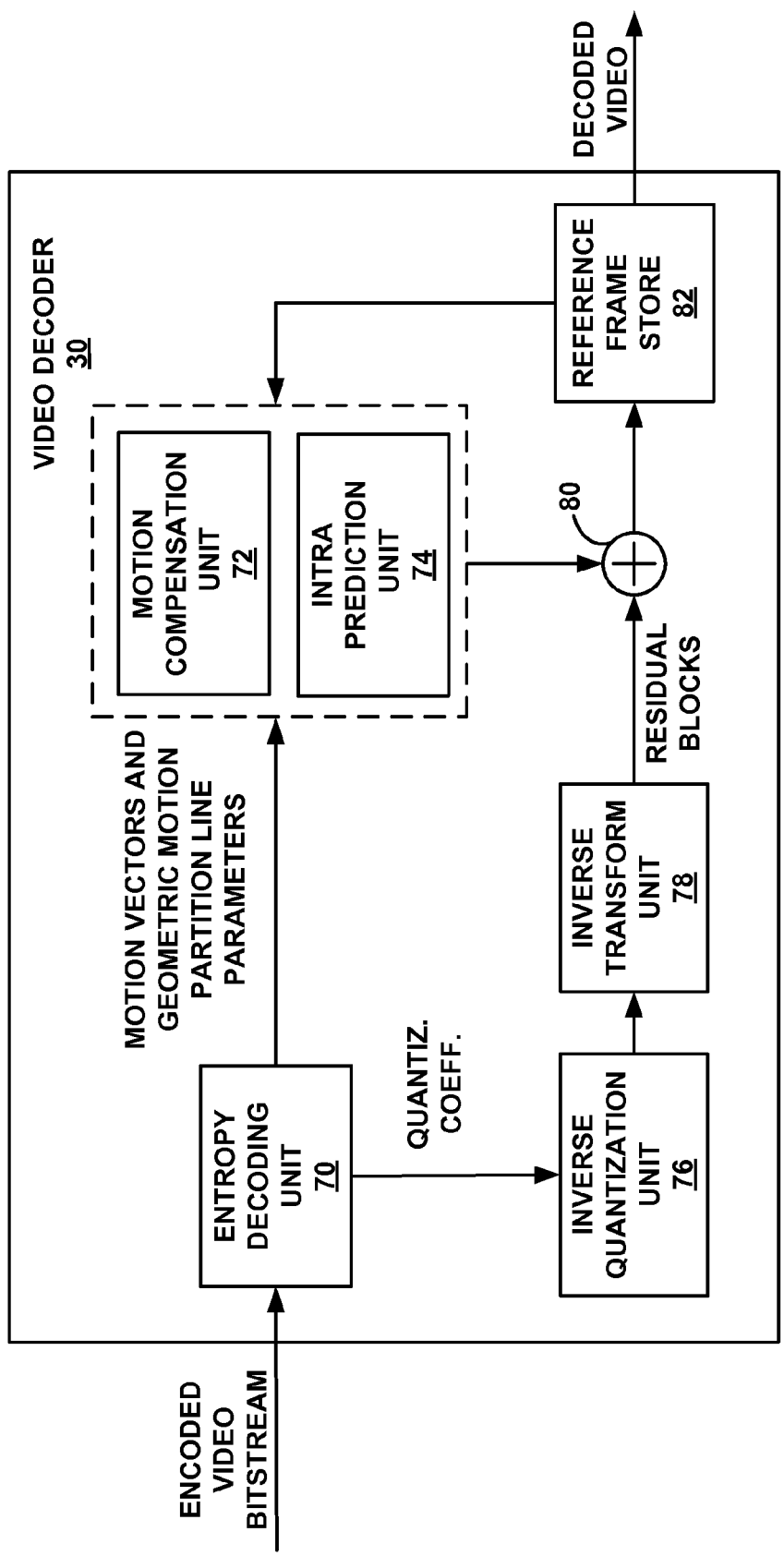
FIG. 3 is a block diagram illustrating an example of video decoder that may decode an encoded video sequence including geometric motion partitioned blocks.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transformation unit 78, reference frame store 82 and summer 80. Video decoder 30 may, in some examples, perform a decoding pass generally reciprocal to the encoding pass described with respect to video encoder 20 (FIG. 2). Intra prediction unit 74 may use intra prediction modes received in the bitstream to form a prediction block from spatially adjacent blocks.

Motion compensation unit 72 may generate prediction data based on motion vectors received from entropy decoding unit 70. When an encoded block is partitioned using a geometric motion partition line, motion compensation unit 72 may receive a definition of the geometric motion partition line for the block in order to determine which pixels of the block correspond to which partition. In some examples, the definition of the line may be according to the angle $\theta$ and length $\rho$ of a line from the origin of the block to the center of the geometric motion partition line. In some examples, the definition of the line may be according to the slope m and y-intercept c of the geometric motion partition line, such that motion compensation unit 72 can calculate a mask indicating to which geometry partition pixels of the block correspond using fixed point arithmetic.

Motion compensation unit 72 may use motion vectors received in the bitstream to identify a prediction block in reference frames in reference frame store 82. In some examples, the motion vectors may be encoded relative to motion predictors, selected from previously encoded blocks or partitions thereof. Accordingly, motion compensation unit 72 may decode the motion vector by determining the motion predictor for the block or partition, then adding the received difference value to the motion predictor.

Motion compensation unit 72 may also be configured to calculate the prediction values for pixels in a transition region between geometric motion partitions using a smoothing filter. For example, motion compensation unit 72 may apply a 3×3 pixel filter to these pixels in order to determine the prediction values. As another example, motion compensation unit 72 may calculate the prediction value for a pixel in the transition region using a weighted sum of the value from the first partition and the value from the second partition.

Inverse quantization unit 76 inverse quantizes, that is, de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by encoder 50 for each macroblock to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

In some examples, inverse transform unit 78 may receive indications of transform sizes for encoded blocks from motion compensation unit 72. Motion compensation unit 72 may determine whether a block touches a geometric motion partition, and if so, decreases the transform size by one-half, down to a minimum transform size, e.g., 4×4 pixels. In some examples, the transformed blocks may include syntax information that describes the size of the transform to apply.

Motion compensation unit 72 may use syntax information to determine sizes of macroblocks used to encode frame(s) of the encoded video sequence, partition information that describes how each macroblock of a frame of the encoded video sequence is partitioned, modes indicating how each partition is encoded, one or more reference frames for each inter-encoded macroblock or partition, and other information to decode the encoded video sequence.

Summer 80 sums the residual blocks with the corresponding prediction blocks generated by motion compensation unit 72 or intra-prediction unit to form decoded blocks. If desired, a deblocking filter may also be applied to filter the decoded blocks in order to remove blockiness artifacts. The decoded video blocks are then stored in reference frame store 82, which provides reference blocks for subsequent motion compensation and also produces decoded video for presentation on a display device (such as display device 32 of FIG. 1).

Figure 4:
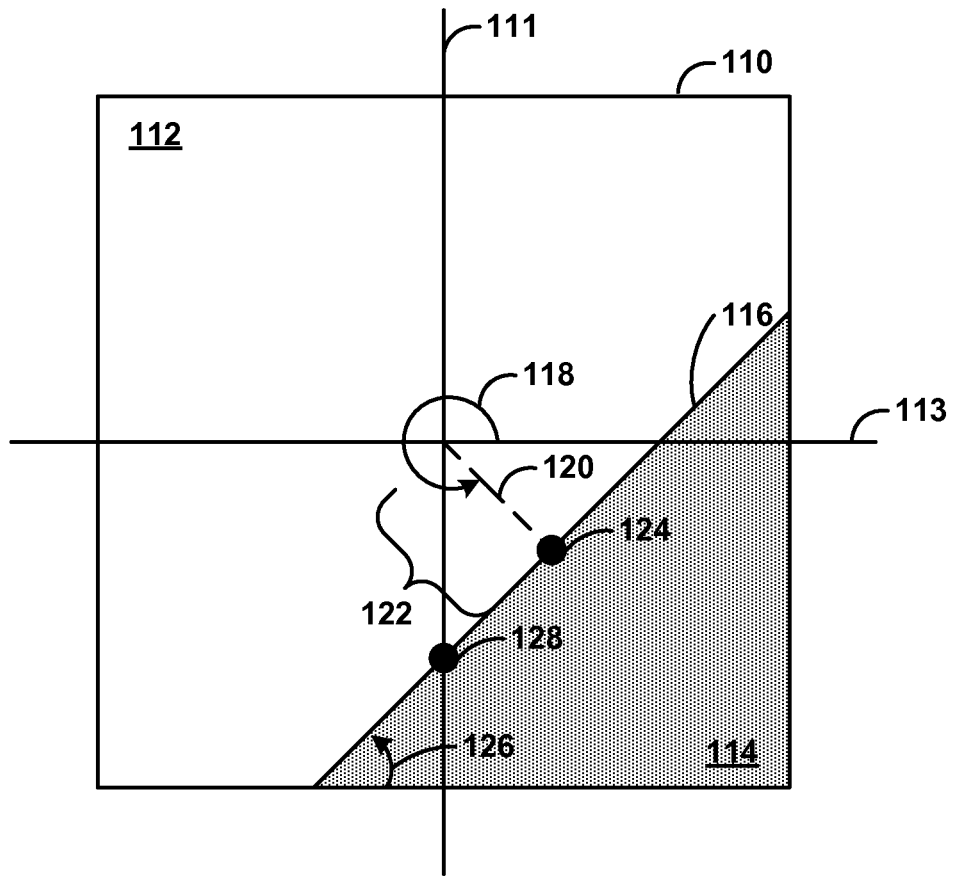
FIG. 4 is a conceptual diagram illustrating a block that has been partitioned using a geometric motion partition line and parameters used to define the geometric motion partition line.

FIG. 4 is a conceptual diagram illustrating a block 110 that has been partitioned using a geometric motion partition line 116. Geometric motion partition line 116 partitions block 110 into two partitions: region 112 and region 114.

In some examples, geometric motion partition line 116 may be defined according to characteristics of perpendicular line 120. In particular, let the intersection of x-axis 113 and y-axis 111 be defined as the origin for block 110. Perpendicular line 120 is perpendicular to geometric motion partition line 116, and intersects geometric motion partition line 116 at a point 124. Angle 118 corresponds to the angle of perpendicular line 120 relative to x-axis 113. Distance 122 corresponds to the distance between the origin of block 110 and point 124 of geometric motion partition line 116, which is also the perpendicular distance of geometric motion partition line 116 from the origin of block 110. Angle 118 can also be referred to as θ (theta), while distance 122 can also be referred to as ρ (rho), as θ and ρ are defined above. In this manner, geometric motion partition line 116 may be defined for block 110 using the combination of angle 118 and distance 122.

Alternatively, geometric motion partition line 116 may be defined according to slope 126 and y-intercept 128. Slope angle 126 corresponds to the slope of geometric motion partition line 116. Y-intercept 128 corresponds to the point at which geometric motion partition line 116 intersects y-axis 111. Slope 126 may also be expressed using m, while y-intercept 128 may be expressed using c, as defined above. Slope 126 and y-intercept 128 may be expressed as integer values, to permit fixed point arithmetic to be used to calculate a mask for block 110 that indicates whether a pixel is in region 112 or region 114. Slope 126 and y-intercept 128 are mathematically related to angle 118 and distance 120 by equation (1) above, reproduced below for convenience:

$$y = \frac{-1}{\tan(\theta)}x + \frac{\rho}{\sin(\theta)} = mx + c. \quad (1)$$

Figure 5:
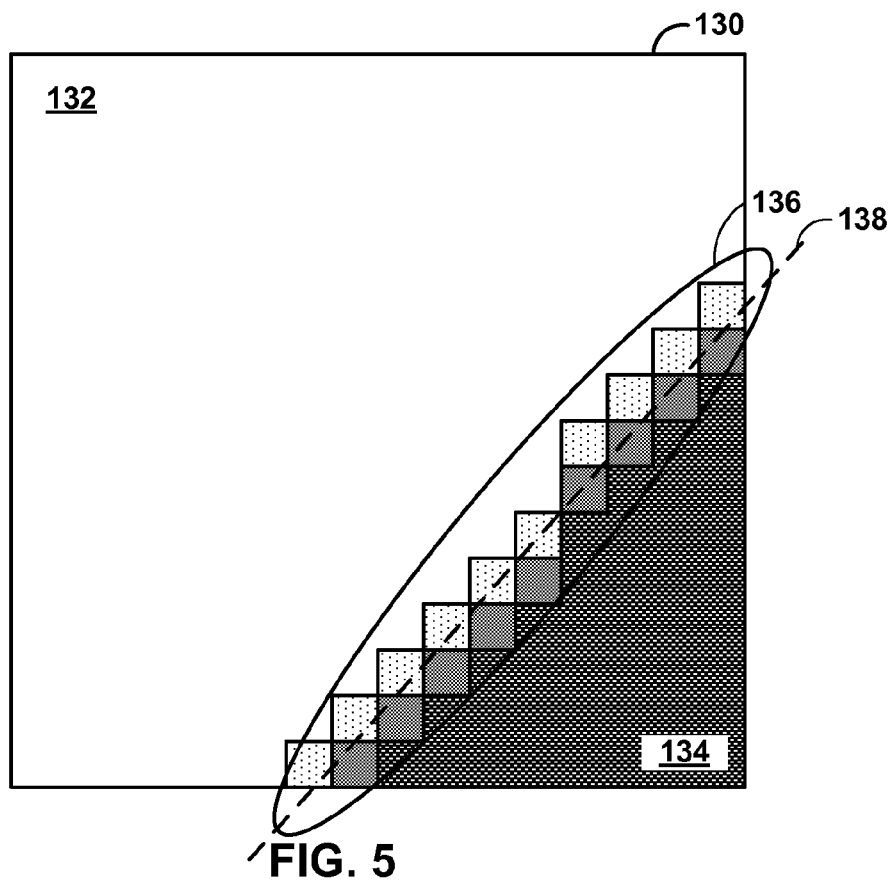
FIG. 5 is a conceptual diagram illustrating a block that has been partitioned using a geometric motion partition line and pixels in a transition region near the geometric motion partition line.

FIG. 5 is a conceptual diagram illustrating block 130 that has been partitioned using a geometric motion partition line 138. Geometric motion partition line 138 divides block 130 into two regions: region 132 and region 134. Transition region 136 includes pixels near geometric motion partition line 138. In some examples, transition region 136 may be defined to include pixels having at least one neighboring pixel in region 132 and at least one neighboring pixel in region 134. The neighboring pixels may include any or all of above-neighboring, below-neighboring, left-neighboring, right-neighboring, above-left-neighboring, above-right-neighboring, below-left-neighboring, and/or below-right neighboring.

Pixels in transition region 136 are illustrated with various levels of shading to indicate whether the pixels are closer to region 132 or region 134. In particular, lighter-shaded pixels are closer to region 132, while darker-shaded pixels are closer to region 134, in this example. In one example, a pixel may be said to be closer to a particular region when a majority of neighboring pixels to the pixel are in the region. In some examples, video encoder 20 and/or video decoder 30 may be configured to apply a smoothing filter to pixels in transition region 136.

Figure 6:
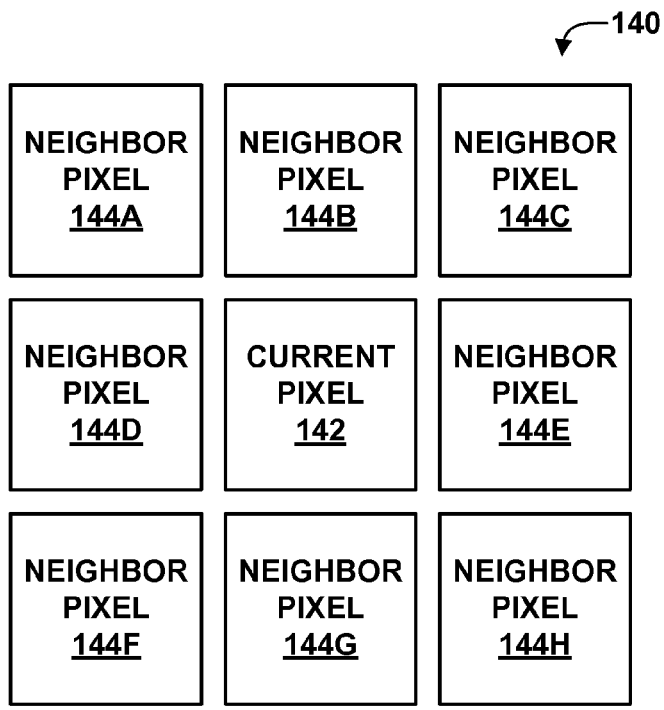
FIG. 6 is a conceptual diagram illustrating a 3×3 pixel array.

FIG. 6 is a conceptual diagram illustrating a 3×3 pixel array 140. Pixel array 140 includes a current pixel 142 and neighboring pixels 144A-144H (neighboring pixels 144). In particular, pixel 144B corresponds to an above-neighboring pixel, pixel 144G corresponds to a below-neighboring pixel, pixel 144D corresponds to a left-neighboring pixel, pixel 144E corresponds to a right-neighboring pixel, pixel 144A corresponds to an above-left-neighboring pixel, pixel 144C corresponds to an above-right-neighboring pixel, pixel 144F corresponds to a below-left-neighboring pixel, and pixel 144H corresponds to a below-right neighboring pixel, in the example of FIG. 6.

Pixel array 140 may be used when determining whether current pixel 142 is in a transition region, that is, a region near a geometric motion partition line. When two or more of neighboring pixels 144 are in different regions, current pixel 142 may be said to be included in the transition region. For example, if neighbor pixel 144D is in region zero and neighbor pixel 144E is in region one, current pixel 142 may be said to be in the transition region. In some examples, current pixel 142 may be said to be closer to a particular region when a majority of neighboring pixels are in the region. For example, current pixel 142 may be said to be closer to region zero if neighboring pixels 144A, 144B, 144C, 144D, and 144F are in region zero and neighboring pixels 144E, 144G, and 144H are in region one.

Pixel array 140 may also be used to define a 3×3 smoothing filter to adjust the value of current pixel 142. The filter may have defined weights for each of current pixel 142 and neighbor pixels 144. To calculate a value for current pixel 142, the weights of each of the pixels in pixel array 140 may be multiplied by the values of the pixels at the corresponding locations, then added and divided by the sum of the weights. In one example, neighbor pixel 144A has a weight of 1, neighbor pixel 144B a weight of 2, neighbor pixel 144C a weight of 1, neighbor pixel 144D a weight of 2, neighbor pixel 144E a weight of 2, neighbor pixel 144F a weight of 1, neighbor pixel 144G a weight of 2, neighbor pixel 144H a weight of 1, and current pixel 142 a weight of 3. These weights may be multiplied by the value of the respective pixels, and then divided by 15 (1+2+1+2+3+2+1+2+1) to calculate a smoothed value for current pixel 142.

In another example, neighbor pixel 144A has a weight of 0, neighbor pixel 144B a weight of 1, neighbor pixel 144C a weight of 0, neighbor pixel 144D a weight of 1, neighbor pixel 144E a weight of 1, neighbor pixel 144F a weight of 0, neighbor pixel 144G a weight of 1, neighbor pixel 144H a weight of 0, and current pixel 142 a weight of 4. These weights may be multiplied by the value of the respective pixels, then divided by 8 (1+1+4+1+1) to calculate a smoothed value for current pixel 142. Other weights may be assigned to neighbor pixels 144 and current pixel 142 as well, in other examples, to create other smoothing filters. Moreover, the weights assigned to neighboring pixels 144 need not necessarily be symmetric. Furthermore, larger smoothing filters may also be defined, e.g., 5×5, 7×7, etc.

Figure 7:
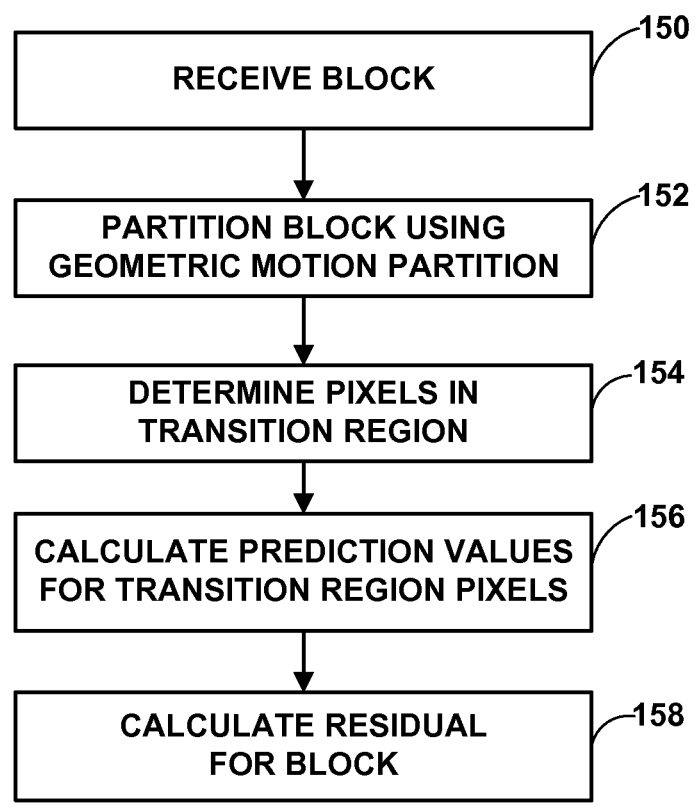
FIG. 7 is a flowchart illustrating an example method for performing smoothing when calculating a residual value for a block partitioned with a geometric motion partition line.

FIG. 7 is a flowchart illustrating an example method for performing smoothing when calculating a residual value for a block partitioned with a geometric motion partition line. Although described with respect to video encoder 20 for purposes of example, it should be understood that the method of FIG. 7 may be performed by any other processing unit. For example, the method of FIG. 7 may also be applied by video decoder 30.

Initially, video encoder 20 receives a block of video data to be encoded (150). It is assumed for purposes of this example that the block corresponds to a block of an inter-prediction encoded frame, e.g., a P-frame or a B-frame. Motion estimation unit 42 may perform a motion search for the block. As a result of the motion search, motion estimation unit 42 may determine that the block should be partitioned using a geometric motion partition line (152). As a result, motion estimation unit 42 may partition the block using a geometric motion partition line, producing two motion vectors, one for each geometric motion partition.

Motion estimation unit 42 may send the motion vectors to motion compensation unit 44, along with a definition of the geometric motion partition line. The definition of the geometric motion partition line may be expressed using angle and distance values for a perpendicular line from the origin of the block to the geometric motion partition line, or using slope and y-intercept values for the geometric motion partition line, in some examples. Motion compensation unit 44 may calculate a mask for the block using the definition of the geometric motion partition line. When the line is defined using the angle and length of the perpendicular line, the calculation may be made using floating point arithmetic. When the line is defined using the slope and y-intercept of the geometric motion partition line, the calculation may be made using fixed point arithmetic.

Motion compensation unit 44 may determine pixels in the block that correspond to a transition region (154). These pixels may correspond to pixels having at least one neighboring pixel in one of the geometric motion partitions and another neighboring pixel in the other geometric motion partition. The set of neighboring pixels may include only direct neighbors of (e.g., directly above, below, and beside) the pixel, or may include diagonal neighbors to the pixel. Motion compensation unit 44 may then begin a smoothing process for the pixels in the transition region.

Pixels in the transition region, by definition, include neighbors in both geometric motion partitions of the block. Thus, smoothing occurs between the two partitions by calculating prediction values for the pixels in the transition region using values from both partitions of the block (156). In some examples, smoothing of pixels in the transition region occurs by calculating a weighted sum of the values for collocated pixels in the transition region from each partition.

In some examples, smoothing of pixels in the transition region occurs by averaging the values of pixels surrounding a pixel in the transition region to calculate a prediction value for the pixel in the transition region, which includes neighboring pixels in each partition. Accordingly, motion compensation unit 44 may calculate the prediction values for the pixels in the transition region by applying a filter having assigned weights as coefficients to the pixel to be filtered and neighboring pixels. Motion compensation unit 44 may then average these values by adding each of the values and dividing by the sum of the weights to produce a prediction value for the filtered pixel.

Motion compensation unit 44 may calculate prediction values for each of the pixels in the transition region in a similar manner. Then, video encoder 20 may calculate a residual value for the block by subtracting the prediction values from the original block (158), e.g., using summer 50. As described in greater detail below, video encoder 20 may divide the residual for the block into sub-blocks of varying sizes to be transformed by transform unit 52. The sizes of the transitions applied to the sub-blocks may be determined adaptively based on whether the geometric partition line passes through the partitions. Video encoder 20 may also output the calculated residual. Outputting may include transmitting over a network, broadcasting, storing to a computer readable medium, or otherwise outputting the data.

The method of FIG. 7 can be summarized as a method including partitioning a block of video data into a first partition and a second partition using a geometric motion partition line, calculating a prediction value of a pixel in a transition region of the block using a filter that applies a value for at least one neighboring pixel from the first partition and a value for at least one neighboring pixel from the second partition, calculating a residual value of the pixel in the transition region of the block based on the prediction value of the pixel in the transition region, and outputting the residual value of the pixel.

A similar method can be performed by video decoder 30. Such a method may include receiving an encoded block of video data, a definition of a geometric motion partition line that partitions the encoded block into a first partition and a second partition, and a residual value for a pixel in a transition region of the block, calculating a prediction value of the pixel in the transition region of the block using a filter that applies a value for at least one neighboring pixel from the first partition and a value for at least one neighboring pixel from the second partition, calculating a reconstructed value for the pixel in the transition region of the block based on the prediction value and the residual value, and outputting the reconstructed value of the pixel.

Figure 8:
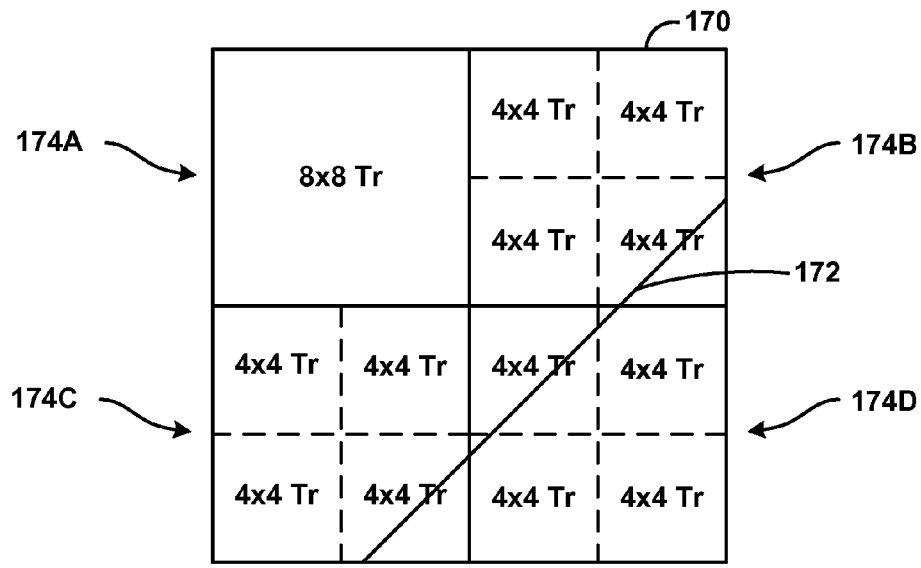
FIG. 8 is a conceptual diagram illustrating an example block to be transformed using adaptive transform size selection.

FIG. 8 is a conceptual diagram illustrating an example block 170 to be transformed using adaptive transform size selection. Block 170 has been partitioned using geometric motion partition line 172. In the example of FIG. 8, block 170 is a 16×16 pixel block. Transform unit 52 (FIG. 2) may be configured with various transforms of different sizes in order to transform sub-blocks of block 170 using different transforms. Video encoder 20 may first divide block 170 into four 8×8 blocks 174A-174D (8×8 blocks 174), where Tr designates "transform" indicating the transform size.

For each of the 8×8 blocks 174, video encoder 20 may determine whether geometric motion partition line 172 passes through the 8×8 block. If so, video encoder 20 may further divide the 8×8 block into a 4×4 block. Otherwise, video encoder 20 may transform the 8×8 block using an 8×8 transform.

In the example of FIG. 8, geometric motion partition line 172 passes through 8×8 blocks 174B, 174C, and 174D. Therefore, 8×8 blocks 174B, 174C, and 174D are further divided into non-overlapping 4×4 blocks. Accordingly, the 4×4 sub-blocks of 8×8 blocks 174B, 174C, and 174D will be transformed using a 4×4 transform, in this example. Video encoder 20 may be configured with a minimum transform size of 4×4, and thus not further divide the 4×4 blocks. However, the minimum transform size need not be 4×4, but may instead by 2×2, or video encoder 20 may not be configured with a minimum transform size. In some examples, the minimum transform size may be larger than 4×4. In this example, geometric motion partition line 172 does not pass through 8×8 block 174A, and therefore, an 8×8 transform is to be applied to 8×8 block 174A.

Figure 9:
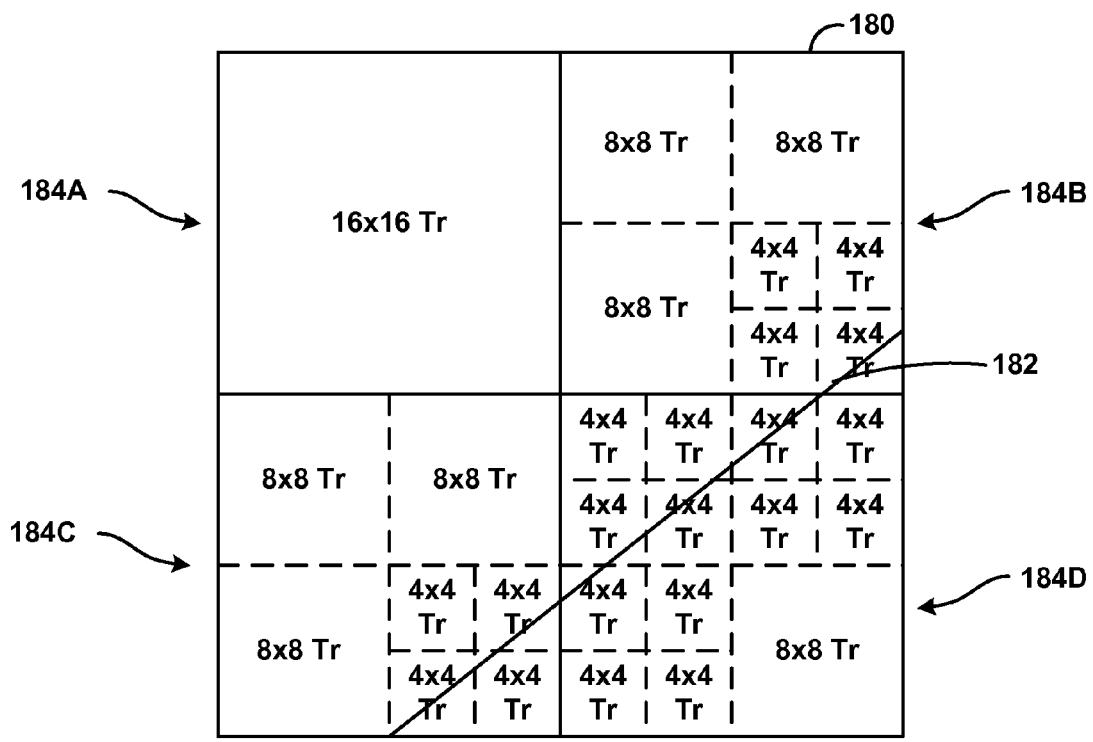
FIG. 9 is a conceptual diagram of another example block to be transformed using adaptive transform size selection.

FIG. 9 is a conceptual diagram of another example block 180 to be transformed using adaptive transform size selection. In this example, block 180 comprises a 32×32 block that has been partitioned by geometric motion partition line 182. Initially, video encoder 20 may partition block 180 into four 16×16 blocks 184A-184D (16×16 blocks 184). Video encoder 20 may then determine whether geometric motion partition line 182 passes through any of 16×16 blocks 184.

In this example, geometric motion partition line 182 does not pass through 16×16 block 184A. Therefore, video encoder 20 may transform 16×16 partition 184A using a 16×16 partition. Video encoder 20 may further divide 16×16 blocks 184B, 184C, and 184D into 8×8 blocks, as shown in FIG. 9, because geometric motion partition line 182 passes through 16×16 blocks 184B, 184C, and 184D. Video encoder 20 may further divide each of the 8×8 blocks through which geometric motion partition line 182 passes into 4×4 blocks, again as shown in the example of FIG. 9. In this example, one 8×8 block of 16×16 block 184B is further divided into 4×4 blocks; one 8×8 block of 16×16 block 184C is further divided into 4×4 blocks, and three of the 8×8 blocks of 16×16 block 184D are further divided into 4×4 blocks. For purposes of example, it is assumed that video encoder 20 is configured with a minimum transform size of 4×4.

Video encoder 20 may transform the undivided 8×8 blocks using an 8×8 transform size, and each of the 4×4 blocks using a 4×4 transform size. Video encoder 20 may transform 16×16 block 184A using a 16×16 transform. In this manner, video encoder 20 may adaptively determine a transform size for sub-blocks of block 180 based on whether the sub-blocks touch geometric motion partition line 182.

Figure 10:
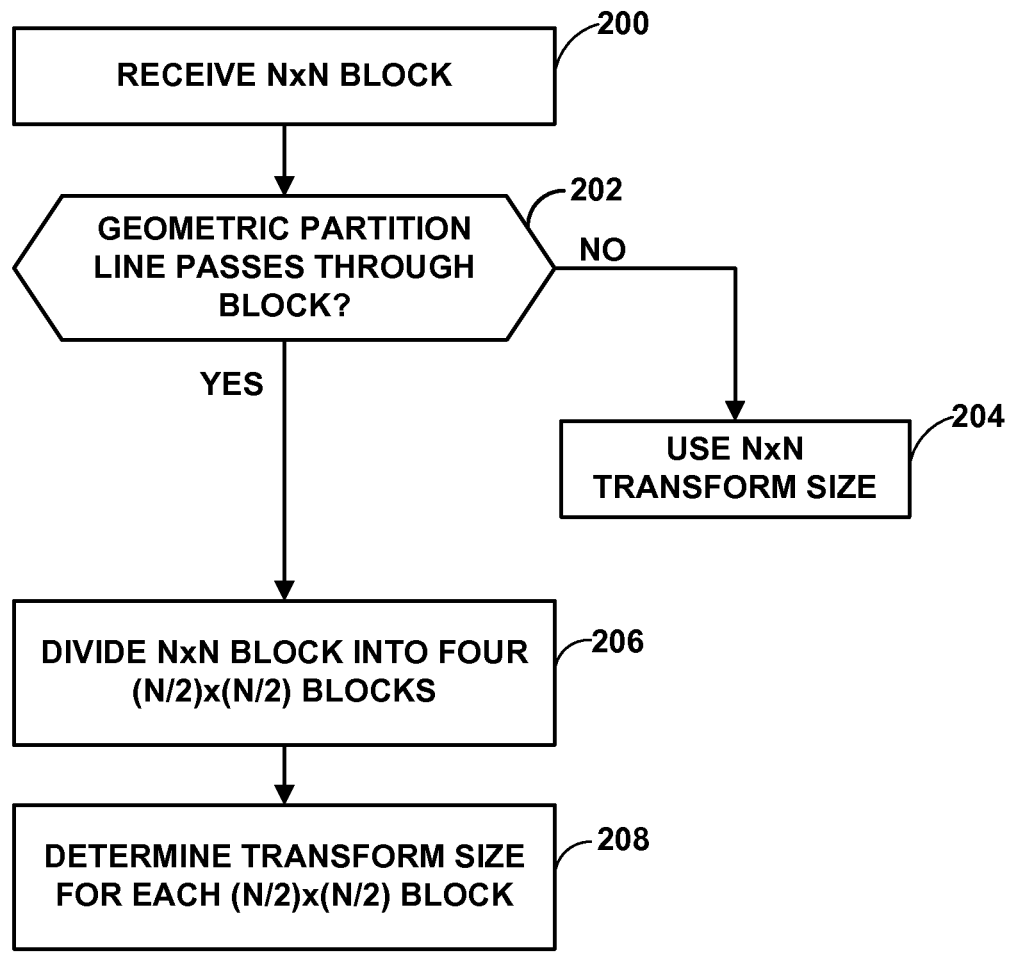
FIG. 10 is a flowchart illustrating an example method for determining transform sizes for sub-blocks of an N×N block.

FIG. 10 is a flowchart illustrating an example method for determining transform sizes for sub-blocks of an N×N block. Although described with respect to video encoder 20 for purposes of example, it should be understood that the method of FIG. 10 may be performed by any other processing unit. For example, the method of FIG. 10 may also be applied by video decoder 30 to determine transform sizes for sub-blocks of an N×N block, e.g., to inverse transform the sub-blocks.

Initially, video encoder 20 receives an N×N block (200). The N×N block may be a full block that has been partitioned or a sub-block thereof. Video encoder 20 may determine whether a geometric motion partition line passes through the N×N block (202). If not ("NO" branch of 202), video encoder 20 may use an N×N transform size to transform the N×N block (204).

On the other hand, if the geometric motion partition line does pass through the N×N block ("YES" branch of 202), video encoder 20 may divide the N×N block into four non-overlapping (N/2)×(N/2) blocks (206). Then, video encoder 20 may determine a transform size for each (N/2)×(N/2) block (208). To do so, video encoder 20 may make a recursive call on the method of FIG. 10 for each (N/2)×(N/2) block. That is, video encoder 20 may determine whether the geometric motion partition line passes through each (N/2)×(N/2) block. For those that it does not, video encoder 20 may transform using an (N/2)×(N/2) transform size, and for those that it does, video encoder 20 may further sub-divide into four (N/4)×(N/4) blocks and determine a transform size for each (N/4)×(N/4) block, again potentially using a recursive instance of the method of FIG. 10. Video encoder 20 may then output the transformed sub-blocks. Outputting may include transmitting over a network, broadcasting, storing to a computer readable medium, or otherwise outputting the data.

An example method similar to the method of FIG. 10 may include partitioning a block of video data into a first geometric partition and a second geometric partition using a geometric motion partition line, wherein the block comprises N×N pixels, dividing the block of video data into four equally-sized, non-overlapping (N/2)×(N/2) sub-blocks, and encoding at least one of the sub-blocks through which the geometric motion partition line passes using a transform size smaller than (N/2)×(N/2).

A similar method may be performed by video decoder 30. An example method performed by a video decoder may include receiving an encoded block of video data partitioned into a first geometric partition and a second geometric partition by a geometric motion partition line, wherein the block comprises N×N pixels, dividing the block of video data into four equally-sized, non-overlapping (N/2)×(N/2) sub-blocks, and inverse transforming at least one of the sub-blocks through which the geometric motion partition line passes using a transform size smaller than (N/2)×(N/2).

The pseudocode below provides an example function "determineTransformSize" for determining a transform size for a block with a starting point at (x, y), as an example partial implementation of the method of FIG. 10. The variables slope and intercept are the slope and intercept values defining a geometric motion partition line for the block. The variable _minTransform is a global variable defined according to the minimum transform size both horizontally and vertically, e.g., 4. The variable currSize is a current transform size, which may initialize with (N/2) for an N×N block that has been geometrically motion partitioned.

The variable startPartition corresponds to the partition for the starting pixel of the block at (x, y), while the variable curPartition tracks the partition for a current pixel of the block. The values startPartition and curPartition are calculated using a c-like conditional operator "?," where "condition ? result1 : result2" returns result1 if "condition" is true, otherwise returns result2. The two for loops iterate through the pixels of the block. If at some point the partition for a current pixel does not match the partition of the starting pixel, then the geometric motion partition line passes through the block. This causes the for loops to break and a recursive call to determineTransformSize with the current transform size currSize reduced by one-half. Otherwise, if all pixels of the block remain in the same partition, the transform size currSize can be used to transform the block.

```
int determineTransformSize (int currSize, int x, int y, int slope,
int intercept) {
   if (currSize > _minTransform) {
      int curPartition = 0;
      int startPartition = ((y – slope * x) > intercept) ? 0 : 1;
      for (int i = x; ((i < x+currSize) && (curPartition == startPartition));
      i++)
         for (int j = y; ((j < y+currSize) && (curPartition ==
         startPartition)); j++)
            curPartition = ((j – slope * i) > intercept) ? 0 : 1;
      if (curPartition == startPartition)
         return currSize;
      else
         return determineTransformSize (currSize / 2, x, y, slope, intercept);
   }
   else
      return currSize;
}
```

Figure 11:
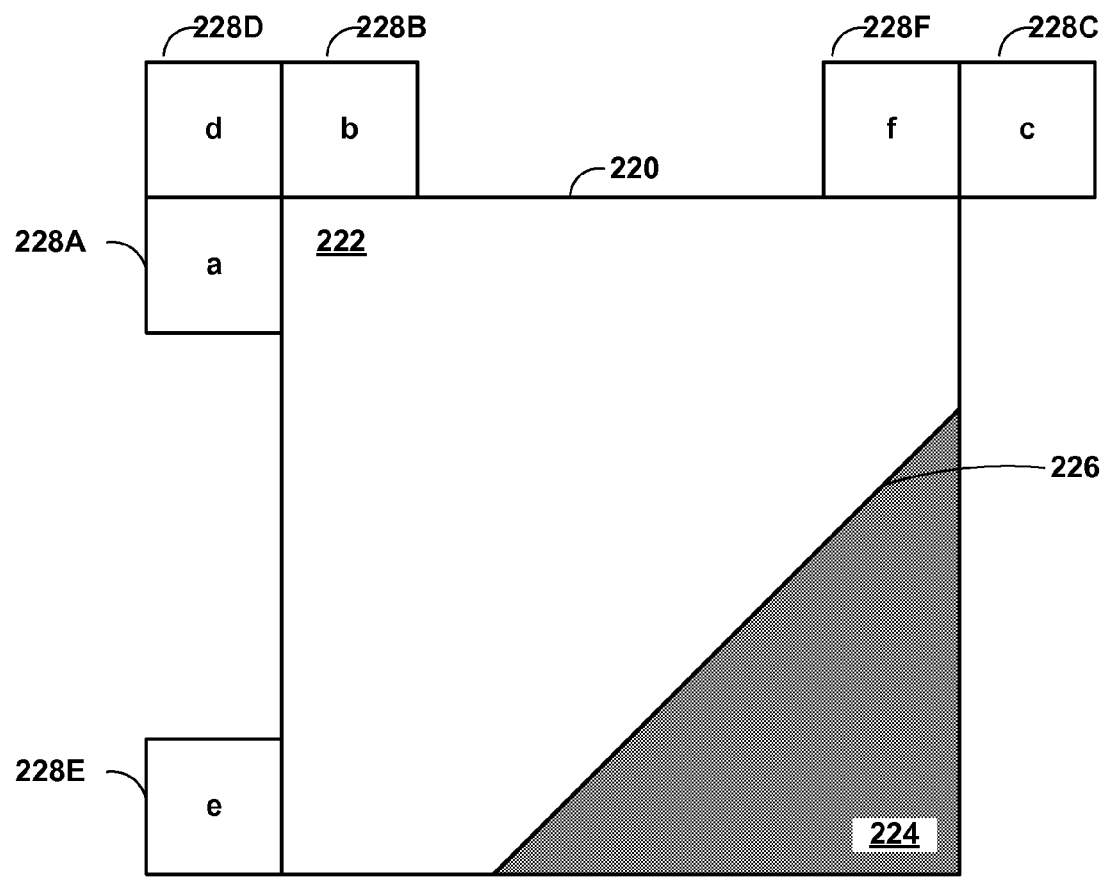
FIG. 11 is a block diagram illustrating a geometry partitioned block and neighboring sub-blocks.

FIG. 11 is a block diagram illustrating a geometry partitioned block 220 and neighboring sub-blocks 228A-228F (neighboring sub-blocks 228). Geometric motion partition line 226 divides block 220 into two partitions: partition 222 and partition 224. A video encoder, such as video encoder 20, may encode motion vectors for partitions 222, 224 relative to motion vectors for respective ones of neighboring sub-blocks 228. That is, video encoder 20 may determine which of neighboring sub-blocks 228 are considered neighbors to each of partitions 222, 224.

Neighbors to partition 222 are not necessarily considered neighbors to partition 224, and likewise, neighbors to partition 224 are not necessarily considered neighbors to partition 222. For example, video encoder 20 may determine that each of sub-blocks 228 are neighbors to partition 222, but none of the sub-blocks 228 is neighbors to partition 224. For each of sub-blocks 228A and 228E, if the pixels located at its right border are neighbors of a partition, the sub-block may be considered as a neighbor to the partition. For each of sub-blocks 228B and 228F, if the pixels located at its lower border are neighbors of a partition, the sub-block may be considered as a neighbor to the partition. Sub-block 228D may be considered a neighbor to a partition if its bottom right corner pixel is a neighbor to the partition. Sub-block 228C may be considered a neighbor to a partition if its bottom left corner pixel is a neighbor to the partition. In another example, if partial border pixels of a sub-block are neighbors, the sub-block may be considered to neighbor the partition.

Video encoder 20 may calculate the median of the motion vectors for sub-blocks 228 considered to neighbor a partition in order to determine a motion predictor for the partition. The motion vectors for sub-blocks 228 considered to neighbor a partition may also be referred to as a set of candidate motion predictors. Assuming for the purpose of example that each of sub-blocks 228 are determined to neighbor partition 222, video encoder 20 may calculate the median of the motion vectors for each of sub-blocks 228 to determine a motion predictor for partition 222. Video encoder 20 may then calculate the difference between the motion vector for partition 222 and the motion predictor for partition 222 to encode the motion vector.

Assuming for the purpose of example that sub-blocks 228C, 228E, and 228F are determined to neighbor partition 224, video encoder 20 may calculate the median of the motion vectors for sub-blocks 228C, 228E, and 228F to determine a motion predictor for partition 224. Video encoder 20 may then calculate the difference between the motion vector for partition 224 and the motion predictor for partition 224 to encode the motion vector.

In this manner, a video encoder or video decoder may select a motion predictor from a larger set of candidate motion predictors than conventional methods, which select from only sub-blocks 228A, 228B, 228C, and 228D. Moreover, a video encoder or video decoder may select the motion predictor for one partition, e.g., partition 222, independently of the motion predictor for the other partition, e.g., partition 224. Thus, the motion predictors for partitions 222, 224 may be different, although partitions 222, 224 are partitions of the same block 220. Accordingly, a video encoder or decoder may select a motion predictor for a partition based on whether sub-blocks relating to candidate motion predictors neighbor the partition, rather than the block containing the partition, that is, the block of which the partition forms a part.

Figure 12:
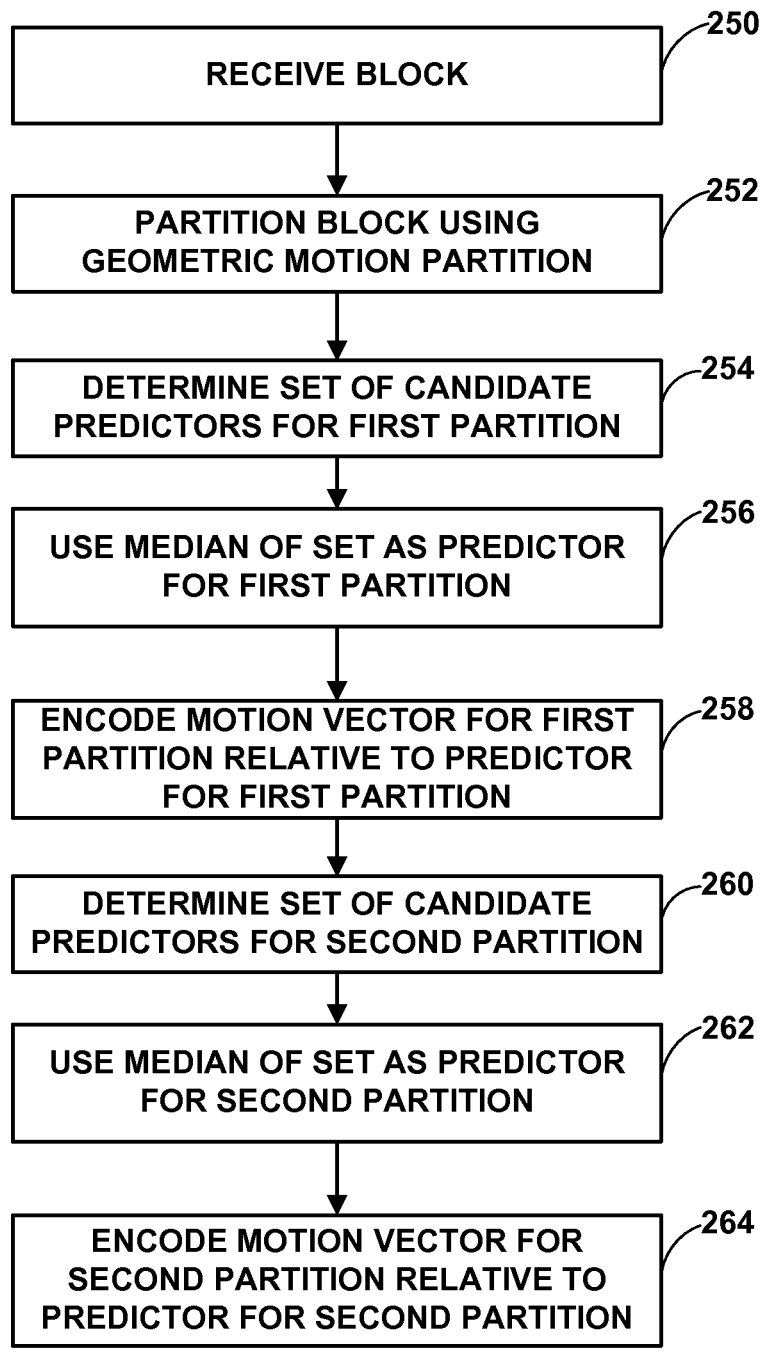
FIG. 12 is a flowchart illustrating an example method for encoding motion vectors of geometric motion partitions of a block of video data.

FIG. 12 is a flowchart illustrating an example method for encoding motion vectors of geometric motion partitions of a block of video data. Although described with respect to video encoder 20 for purposes of example, it should be understood that the method of FIG. 12 may be performed by any other processing unit. For example, the method of FIG. 12 may also be applied by video decoder 30 to decode encoded motion vectors of a block that has been geometrically motion partitioned.

Initially, video encoder 20 may receive a block of video data (250). Video encoder 20 may then partition the block using a geometric motion partition (252). Video encoder 20 may then determine a set of candidate predictors for the first geometric motion partition (254). That is, video encoder 20 may determine which of a set of sub-blocks that neighbor the block are considered to neighbor the first partition as well. Then, video encoder 20 may retrieve motion vectors for the sub-blocks that neighbor the first partition. Video encoder 20 may then calculate the median of these motion vectors and use the calculated median as the motion predictor for the first partition (256). Video encoder 20 may then calculate the difference between the motion vector for the first partition and the motion predictor for the first partition to encode the motion vector relative to the predictor for the first partition (258).

Next, video encoder 20 may determine a set of candidate predictors for the second geometric motion partition (260). That is, video encoder 20 may determine which of a set of sub-blocks that neighbor the block are considered to neighbor the second partition. Then, video encoder 20 may retrieve motion vectors for the sub-blocks that neighbor the second partition. Video encoder 20 may then calculate the median of these motion vectors and use the calculated median as the motion predictor for the second partition (262). Video encoder 20 may then calculate the difference between the motion vector for the second partition and the motion predictor for the second partition to encode the motion vector relative to the predictor for the second partition (264). Video encoder 20 may then output the encoded motion vectors. Outputting may include transmitting over a network, broadcasting, storing to a computer readable medium, or otherwise outputting the data.

In this manner, video encoder 20 may encode motion vectors for geometric motion partitions of a block independently of each other, using candidate motion predictors independently selected for each partition. Thus, video encoder 20 may perform a method including partitioning a block of video data into a first partition and a second partition using a geometric motion partition line, determining a first motion vector for the first partition and a second motion vector for the second partition, encoding the first motion vector based on a first motion predictor selected from motion vectors for blocks neighboring the first partition, encoding the second motion vector based on a second motion predictor selected from motion vectors for blocks neighboring the second partition, wherein the blocks neighboring the second partition are determined independently of the blocks neighboring the first partition, and outputting the encoded first and second motion vectors. Video encoder 20 may also select the candidate motion predictors from a larger set of motion vectors than conventionally used, as discussed with respect to FIG. 11.

Video decoder 30 may utilize a similar method to decode an encoded motion vector for an encoded block. Rather than calculating the difference between a motion predictor and a motion vector, video decoder 30 may receive an encoded motion vector and add the value for the encoded motion vector to the motion predictor to decode the motion vector. Accordingly, video decoder 30 may perform a method including receiving a block of video data partitioned by a geometric motion partition line into a first partition and a second partition, a first encoded motion vector for the first partition, and a second encoded motion vector for the second partition, decoding the first encoded motion vector based on a first motion predictor selected from motion vectors for blocks neighboring the first partition, decoding the second encoded motion vector based on a second motion predictor selected from motion vectors for blocks neighboring the second partition, wherein the blocks neighboring the second partition are determined independently of the blocks neighboring the first partition, and decoding the block using the decoded first and second motion vectors.

Figure 13:
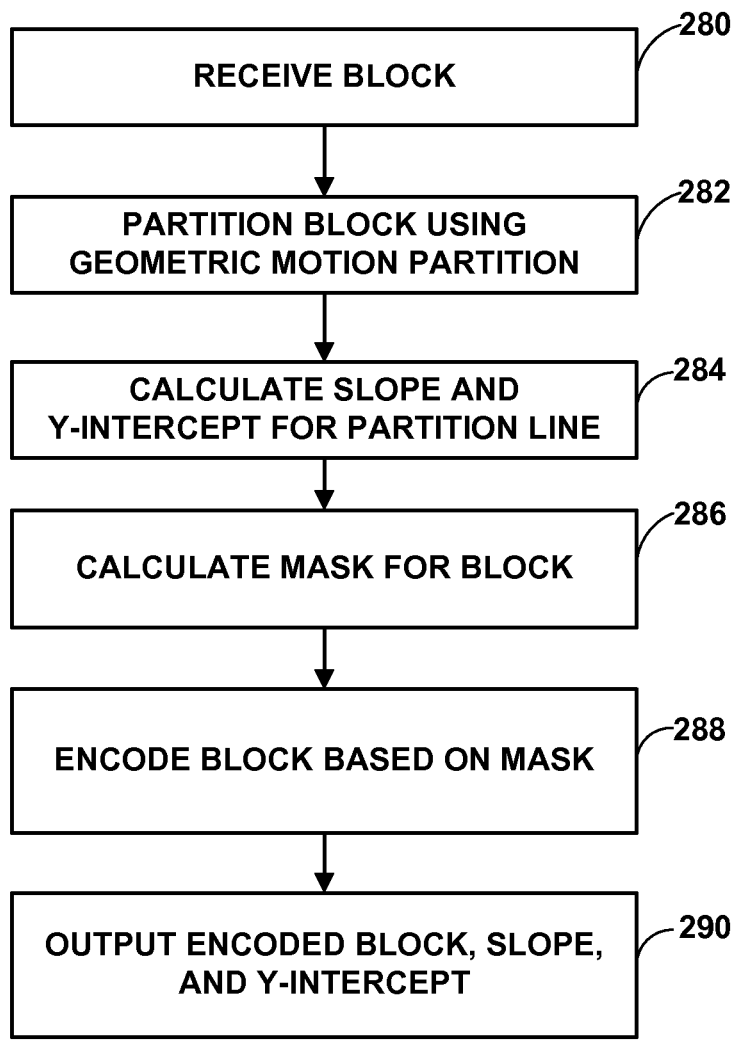
FIG. 13 is a flowchart illustrating an example method for encoding a block of video data using a fixed point implementation.

FIG. 13 is a flowchart illustrating an example method for encoding a block of video data using a fixed point implementation. Although described with respect to video encoder 20 for purposes of example, it should be understood that methods similar to that of FIG. 13 may be performed by other processing units. For example, a method similar to that of FIG. 13 may also be applied by video decoder 30 to decode video data in a fixed point implementation.

Initially, video encoder 20 may receive a block of video data (280). Video encoder 20 may then partition the block using a geometric motion partition (282). Video encoder 20 may define a geometric motion partition line, used to partition the block, according to an angle θ and length ρ of a line segment perpendicular to the geometric motion partition line and starting from the origin of the block.

Video encoder 20 may be configured with step sizes for the angle and length values, such that the angle and length values can be stored by an integer having a particular number of bits. As an example, video encoder 20 may be configured to store the angle value defining a geometric motion partition line within a five-bit number. The angle value may have a step size of one and a range between 0 and 31, inclusive. Thus, the difference between two consecutive steps in the angle value may represent a difference of 11.25 degrees. The length value may depend on the size of the block, and may correspond to a signed integer having a range of 0 to N/2−1, inclusive, where N represents the block size. Thus, for example, for 16×16 blocks, the length value may correspond to a signed integer between 0 and 7; for 32×32 blocks, the length value may correspond to a signed integer between 0 and 15; and for 64×64 blocks, the length value may correspond to a signed integer between 0 and 31.

To allow for a fixed point implementation, however, video encoder 20 may calculate a slope and y-intercept for the geometric motion partition line (284), e.g., according to formula (1). Video encoder 20 may express the slope and y-intercept as integer values. That is, video encoder 20 may calculate the slope and y-intercept values from the angle and length values, multiply the slope and y-intercept values by an integer value, e.g., 65536, then round the calculated slope and y-intercept values to the nearest integer. Video encoder 20 may store the resulting slope and y-intercept values as a suitably-sized bit vector, e.g., a 32-bit integer value.

Video encoder 20 may then calculate a mask for the block using the slope and y-intercept values (286). That is, video encoder 20 may iterate through each point of the block to determine whether the point is in region 0 or region 1 (e.g., partition 222 or partition 224, in the example of FIG. 11). Video encoder 20 may refer to the mask when encoding the block, that is, encode the block based on the mask (288). For example, video encoder 20 may determine the boundaries of each partition of the block, in order to calculate a residual for the block. That is, video encoder 20 may refer to the mask to determine whether to retrieve a value for the pixels of the block using the motion vector associated with the first partition or the motion vector associated with the second partition.

Video encoder 20 may retrieve values for the pixels using these motion vectors and calculate a residual for the block by calculating the difference between these values and the block to be encoded. In this manner, video encoder 20 may determine whether pixels in the block correspond to the first partition or the second partition using the mask, retrieve prediction values for pixels in the first partition from a reference block indicated by a motion vector for the first partition, and retrieve prediction values for pixels in the second partition from a reference block indicated by a motion vector for the second partition.

In some examples, video encoder 20 may smooth the transition between partitions using the smoothing techniques described in this disclosure. That is, video encoder 20 may determining a set of pixels of the block in a transition region, and calculate prediction values for the set of pixels in the transition region based on the reference block indicated by the motion vector for the first partition and the reference block indicated by the motion vector for the second partition.

Video encoder 20 may then output the encoded block, as well as the slope and y-intercept values that define the geometric motion partition line (290). Outputting may include transmitting over a network, broadcasting, storing to a computer readable medium, or otherwise outputting the data. Video encoder 20 may further encode the motion vectors for the partitions using the techniques of this disclosure, and may apply the adaptive transform size selection techniques of this disclosure when transforming the sub-blocks of the residual.

In this manner, an example method corresponding to the method of FIG. 13 that may be performed by a video encoder, such as video encoder 20, may include partitioning a block of video data into a first partition and a second partition using a geometric motion partition line, calculating a slope value and a y-intercept value of the geometric motion partition line, wherein the slope value and the y-intercept value comprise integer values, calculating a mask indicative of pixels of the block in the first partition and pixels of the block in the second partition, encoding the first partition and the second partition based on the mask, and outputting the encoded first partition, the encoded second partition, the slope value, and the y-intercept value.

A video decoder, such as video decoder 30, may perform a similar method for decoding video data. An example method of decoding video data may include receiving an encoded block of video data that has been partitioned into a first partition and a second partition by a geometric motion partition line, receiving a slope value and a y-intercept value defining the geometric motion partition line, wherein the slope value and the y-intercept value comprise integer values, calculating a mask indicative of pixels of the block in the first partition and pixels of the block in the second partition, decoding the first partition and the second partition of the block based on the mask, and outputting the decoded block.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method for encoding video data, the method comprising:
    partitioning a block of video data into a first partition and a second partition using a geometric motion partition line;
    determining whether to use a filter that applies a value for at least one neighboring pixel from the first partition and a value for at least one neighboring pixel from the second partition during calculation of a prediction value of a pixel in a transition region of the block based on one or more conditions related to the pixel in the transition region, wherein the one or more conditions include at least one of a difference of pixel values along a line that is perpendicular to the geometric motion partition line, a difference between a motion vector for the first partition and a motion vector for the second partition, a direction of the geometric motion partition line, reference frame indexes for the first partition and the second partition, quantization parameters for the first partition and the second partition, and numbers of pixels in the first partition and the second partition;
    in response to determining to use the filter, calculating the prediction value of the pixel using the filter, wherein calculating the prediction value comprises determining weights to apply to the value for the at least one neighboring pixel from the first partition and to the value for the at least one neighboring pixel from the second partition based on one or more conditions related to the pixel in the transition region, wherein the one or more conditions include at least one of the difference of pixel values along the line that is perpendicular to the geometric motion partition line, the difference between the motion vector for the first partition and the motion vector for the second partition, the direction of the geometric motion partition line, the reference frame indexes for the first partition and the second partition, the quantization parameters for the first partition and the second partition, and the numbers of pixels in the first partition and the second partition;
    calculating a residual value of the pixel in the transition region of the block based on the prediction value of the pixel in the transition region; and
    outputting the residual value of the pixel.

2. The method of claim 1, wherein the geometric motion partition line passes through a horizontal boundary of the block and a vertical boundary of the block.

3. The method of claim 1, wherein an origin of the block comprises the center of the block, and wherein the geometric motion partition line is defined according to an angle value and a length value, the angle value comprising an angle of a line perpendicular to the geometric motion partition line and passing through the origin relative to an x-axis, and the length value comprising a distance from the origin to a point where the perpendicular line meets the geometric motion partition line.

4. The method of claim 3, further comprising calculating a slope value and a y-intercept value of the geometric motion partition line based on the angle value and the length value, wherein the slope value and the y-intercept value comprise integer values.

5. The method of claim 3, further comprising outputting the angle value and the length value for the geometric motion partition line.

6. The method of claim 1, wherein the filter comprises a matrix of coefficients centered on the pixel in the transition region, and wherein calculating the prediction value comprises:
    calculating products of the coefficients of the filter and values of pixels collocated with the coefficients;
    calculating the sum of the products; and
    dividing the sum of the products by the sum of the coefficients.

7. An apparatus for encoding video data, the apparatus comprising a video encoder configured to partition a block of video data into a first partition and a second partition using a geometric motion partition line, determine whether to use a filter that applies a value for at least one neighboring pixel from the first partition and a value for at least one neighboring pixel from the second partition during calculation of a prediction value of a pixel in a transition region of the block based on one or more conditions related to the pixel in the transition region, wherein the one or more conditions include at least one of a difference of pixel values along a line that is perpendicular to the geometric motion partition line, a difference between a motion vector for the first partition and a motion vector for the second partition, a direction of the geometric motion partition line, reference frame indexes for the first partition and the second partition, quantization parameters for the first partition and the second partition, and numbers of pixels in the first partition and the second partition, in response to determining to use the filter, calculate the prediction value of the pixel in a transition region of the block using the filter, wherein the video encoder is configured to determine weights to apply to the value for the at least one neighboring pixel from the first partition and to the value for the at least one neighboring pixel from the second partition based on one or more conditions related to the pixel in the transition region, wherein the one or more conditions include at least one of the difference of pixel values along the line that is perpendicular to the geometric motion partition line, the difference between the motion vector for the first partition and the motion vector for the second partition, the direction of the geometric motion partition line, the reference frame indexes for the first partition and the second partition, the quantization parameters for the first partition and the second partition, and the numbers of pixels in the first partition and the second partition, calculate a residual value of the pixel in the transition region of the block based on the prediction value of the pixel in the transition region, and output the residual value of the pixel.

8. The apparatus of claim 7, wherein the geometric motion partition line passes through a horizontal boundary of the block and a vertical boundary of the block.

9. The apparatus of claim 7, wherein an origin of the block comprises the center of the block, and wherein the geometric motion partition line is defined according to an angle value and a length value, the angle value comprising an angle of a line perpendicular to the geometric motion partition line and passing through the origin relative to an x-axis, and the length value comprising a distance from the origin to a point where the perpendicular line meets the geometric motion partition line.

10. The apparatus of claim 9, wherein the video encoder is configured to calculate a slope value and a y-intercept value of the geometric motion partition line based on the angle value and the length value, wherein the slope value and the y-intercept value comprise integer values.

11. The apparatus of claim 9, wherein the video encoder is configured to output the angle value and the length value for the geometric motion partition line.

12. The apparatus of claim 7, wherein the filter comprises a matrix of coefficients centered on the pixel in the transition region, and wherein to calculate the prediction value, the video encoder is configured to calculate products of the coefficients of the filter and values of pixels collocated with the coefficients, calculate the sum of the products, and divide the sum of the products by the sum of the coefficients.

13. An apparatus for encoding video data, the apparatus comprising:
    means for partitioning a block of video data into a first partition and a second partition using a geometric motion partition line;
    means for determining whether to use a filter that applies a value for at least one neighboring pixel from the first partition and a value for at least one neighboring pixel from the second partition during calculation of a prediction value of a pixel in a transition region of the block based on one or more conditions related to the pixel in the transition region, wherein the one or more conditions include at least one of a difference of pixel values along a line that is perpendicular to the geometric motion partition line, a difference between a motion vector for the first partition and a motion vector for the second partition, a direction of the geometric motion partition line, reference frame indexes for the first partition and the second partition, quantization parameters for the first partition and the second partition, and numbers of pixels in the first partition and the second partition;
    means for calculating, in response to determining to use the filter, the prediction value of the pixel in the transition region, wherein the means for calculating the prediction value comprises means for determining weights to apply to the value for the at least one neighboring pixel from the first partition and to the value for the at least one neighboring pixel from the second partition based on one or more conditions related to the pixel in the transition region, wherein the one or more conditions include at least one of the difference of pixel values along the line that is perpendicular to the geometric motion partition line, the difference between the motion vector for the first partition and the motion vector for the second partition, the direction of the geometric motion partition line, the reference frame indexes for the first partition and the second partition, the quantization parameters for the first partition and the second partition, and the numbers of pixels in the first partition and the second partition;
    means for calculating a residual value of the pixel in the transition region of the block based on the prediction value of the pixel in the transition region; and
    means for outputting the residual value of the pixel.

14. The apparatus of claim 13, wherein the geometric motion partition line passes through a horizontal boundary of the block and a vertical boundary of the block.

15. The apparatus of claim 13, wherein an origin of the block comprises the center of the block, and wherein the geometric motion partition line is defined according to an angle value and a length value, the angle value comprising an angle of a line perpendicular to the geometric motion partition line and passing through the origin relative to an x-axis, and the length value comprising a distance from the origin to a point where the perpendicular line meets the geometric motion partition line.

16. The apparatus of claim 15, further comprising means for calculating a slope value and a y-intercept value of the geometric motion partition line based on the angle value and the length value, wherein the slope value and the y-intercept value comprise integer values.

17. The apparatus of claim 15, further comprising means for outputting the angle value and the length value for the geometric motion partition line.

18. The apparatus of claim 13, wherein the filter comprises a matrix of coefficients centered on the pixel in the transition region, and wherein the means for calculating the prediction value comprises:
    means for calculating products of the coefficients of the filter and values of pixels collocated with the coefficients;
    means for calculating the sum of the products; and
    means for dividing the sum of the products by the sum of the coefficients.

19. A computer program product comprising a non-transitory computer-readable storage medium having stored thereon instructions that, when executed, cause a processor to:
- partition a block of video data into a first partition and a second partition using a geometric motion partition line;
- determine whether to use a filter that applies a value for at least one neighboring pixel from the first partition and a value for at least one neighboring pixel from the second partition during calculation of a prediction value of a pixel in a transition region of the block based on one or more conditions related to the pixel in the transition region, wherein the one or more conditions include at least one of a difference of pixel values along a line that is perpendicular to the geometric motion partition line, a difference between a motion vector for the first partition and a motion vector for the second partition, a direction of the geometric motion partition line, reference frame indexes for the first partition and the second partition, quantization parameters for the first partition and the second partition, and numbers of pixels in the first partition and the second partition;
- in response to determining to use the filter, calculate the prediction value of the pixel in the transition region of the block using the filter, wherein the instructions that cause the processor to calculate the prediction value comprise instructions that cause the processor to determine weights to apply to the value for the at least one neighboring pixel from the first partition and to the value for the at least one neighboring pixel from the second partition based on one or more conditions related to the pixel in the transition region, wherein the one or more conditions include at least one of the difference of pixel values along the line that is perpendicular to the geometric motion partition line, the difference between the motion vector for the first partition and the motion vector for the second partition, the direction of the geometric motion partition line, the reference frame indexes for the first partition and the second partition, the quantization parameters for the first partition and the second partition, and the numbers of pixels in the first partition and the second partition;
- calculate a residual value of the pixel in the transition region of the block based on the prediction value of the pixel in the transition region; and
- output the residual value of the pixel.

20. The computer program product of claim 19, wherein the geometric motion partition line passes through a horizontal boundary of the block and a vertical boundary of the block.

21. The computer program product of claim 19, wherein an origin of the block comprises the center of the block, and wherein the geometric motion partition line is defined according to an angle value and a length value, the angle value comprising an angle of a line perpendicular to the geometric motion partition line and passing through the origin relative to an x-axis, and the length value comprising a distance from the origin to a point where the perpendicular line meets the geometric motion partition line.

22. The computer program product of claim 21, further comprising instructions that cause the processor to calculate a slope value and a y-intercept value of the geometric motion partition line based on the angle value and the length value, wherein the slope value and the y-intercept value comprise integer values.

23. The computer program product of claim 21, further comprising instructions that cause the processor to output the angle value and the length value for the geometric motion partition line.

24. The computer program product of claim 19, wherein the filter comprises a matrix of coefficients centered on the pixel in the transition region, and wherein the instructions that cause the processor to calculate the prediction value comprise instructions that cause the processor to:
- calculate products of the coefficients of the filter and values of pixels collocated with the coefficients;
- calculate the sum of the products; and
- divide the sum of the products by the sum of the coefficients.

25. A method of decoding video data, the method comprising:
- receiving an encoded block of video data, a definition of a geometric motion partition line that partitions the encoded block into a first partition and a second partition, and a residual value for a pixel in a transition region of the block;
- determining whether to use a filter that applies a value for at least one neighboring pixel from the first partition and a value for at least one neighboring pixel from the second partition during calculation of a prediction value of the pixel in the transition region of the block based on one or more conditions related to the pixel in the transition region, wherein the one or more conditions include at least one of a difference of pixel values along a line that is perpendicular to the geometric motion partition line, a difference between a motion vector for the first partition and a motion vector for the second partition, a direction of the geometric motion partition line, reference frame indexes for the first partition and the second partition, quantization parameters for the first partition and the second partition, and numbers of pixels in the first partition and the second partition;
- in response to determining to use the filter, calculating the prediction value of the pixel in the transition region of the block using the filter, wherein calculating the prediction value comprises determining weights to apply to the value for the at least one neighboring pixel from the first partition and to the value for the at least one neighboring pixel from the second partition based on one or more conditions related to the pixel in the transition region, wherein the one or more conditions include at least one of the difference of pixel values along the line that is perpendicular to the geometric motion partition line, the difference between the motion vector for the first partition and the motion vector for the second partition, the direction of the geometric motion partition line, the reference frame indexes for the first partition and the second partition, the quantization parameters for the first partition and the second partition, and the numbers of pixels in the first partition and the second partition;
- calculating a reconstructed value for the pixel in the transition region of the block based on the prediction value and the residual value; and
- outputting the reconstructed value of the pixel.

26. The method of claim 25, wherein the geometric motion partition line passes through a horizontal boundary of the block and a vertical boundary of the block.

27. The method of claim 25, wherein an origin of the block comprises the center of the block, and wherein receiving the definition of the geometric motion partition line comprises receiving an angle value and a length value, the angle value comprising an angle of a line perpendicular to the geometric motion partition line and passing through the origin relative to an x-axis, and the length value comprising a distance from the origin to a point where the perpendicular line meets the geometric motion partition line.

28. The method of claim 25, wherein receiving the definition of the geometric motion partition line comprises receiving a slope value and a y-intercept value of the geometric motion partition line, wherein the slope value and the y-intercept value comprise integer values.

29. The method of claim 28, wherein calculating the prediction value comprises:
calculating a mask indicative of pixels of the block in the first partition and pixels of the block in the second partition; and
locating the at least one neighboring pixel in the first partition and the at least one neighboring pixel in the second partition based on the mask using fixed point arithmetic.

30. The method of claim 25, wherein the filter comprises a matrix of coefficients centered on the pixel in the transition region, and wherein calculating the prediction value comprises:
calculating products of the coefficients of the filter and values of pixels collocated with the coefficients;
calculating the sum of the products; and
dividing the sum of the products by the sum of the coefficients.

31. An apparatus for decoding video data, the apparatus comprising a video decoder configured to receive an encoded block of video data, a definition of a geometric motion partition line that partitions the encoded block into a first partition and a second partition, and a residual value for a pixel in a transition region of the block, determine whether to use a filter that applies a value for at least one neighboring pixel from the first partition and a value for at least one neighboring pixel from the second partition during calculation of a prediction value of the pixel in the transition region of the block based on one or more conditions related to the pixel in the transition region, wherein the one or more conditions include at least one of a difference of pixel values along a line that is perpendicular to the geometric motion partition line, a difference between a motion vector for the first partition and a motion vector for the second partition, a direction of the geometric motion partition line, reference frame indexes for the first partition and the second partition, quantization parameters for the first partition and the second partition, and numbers of pixels in the first partition and the second partition, in response to determining to use the filter, calculate the prediction value of the pixel in the transition region of the block using the filter, wherein the video decoder is configured to determine weights to apply to the value for the at least one neighboring pixel from the first partition and to the value for the at least one neighboring pixel from the second partition based on one or more conditions related to the pixel in the transition region, wherein the one or more conditions include at least one of the difference of pixel values along the line that is perpendicular to the geometric motion partition line, the difference between the motion vector for the first partition and the motion vector for the second partition, the direction of the geometric motion partition line, the reference frame indexes for the first partition and the second partition, the quantization parameters for the first partition and the second partition, and the numbers of pixels in the first partition and the second partition, calculate a reconstructed value for the pixel in the transition region of the block based on the prediction value and the residual value, and output the reconstructed value of the pixel.

32. The apparatus of claim 31, wherein the geometric motion partition line passes through a horizontal boundary of the block and a vertical boundary of the block.

33. The apparatus of claim 31, wherein an origin of the block comprises the center of the block, and wherein the definition of the geometric motion partition line comprises an angle value and a length value, the angle value comprising an angle of a line perpendicular to the geometric motion partition line and passing through the origin relative to an x-axis, and the length value comprising a distance from the origin to a point where the perpendicular line meets the geometric motion partition line.

34. The apparatus of claim 31, wherein the definition of the geometric motion partition line comprises a slope value and a y-intercept value of the geometric motion partition line, wherein the slope value and the y-intercept value comprise integer values.

35. The apparatus of claim 34, wherein to calculate the prediction value, the video decoder is configured to calculate a mask indicative of pixels of the block in the first partition and pixels of the block in the second partition, and locate the at least one neighboring pixel in the first partition and the at least one neighboring pixel in the second partition based on the mask using fixed point arithmetic.

36. The apparatus of claim 31, wherein the filter comprises a matrix of coefficients centered on the pixel in the transition region, and wherein to calculate the prediction value, the video decoder is configured to calculate products of the coefficients of the filter and values of pixels collocated with the coefficients, calculate the sum of the products, and divide the sum of the products by the sum of the coefficients.

37. An apparatus for decoding video data, the apparatus comprising:
means for receiving an encoded block of video data, a definition of a geometric motion partition line that partitions the encoded block into a first partition and a second partition, and a residual value for a pixel in a transition region of the block;
means for determining whether to use a filter that applies a value for at least one neighboring pixel from the first partition and a value for at least one neighboring pixel from the second partition during calculation of a prediction value of the pixel in the transition region of the block based on one or more conditions related to the pixel in the transition region, wherein the one or more conditions include at least one of a difference of pixel values along a line that is perpendicular to the geometric motion partition line, a difference between a motion vector for the first partition and a motion vector for the second partition, a direction of the geometric motion partition line, reference frame indexes for the first partition and the second partition, quantization parameters for the first partition and the second partition, and numbers of pixels in the first partition and the second partition;
means for calculating, in response to determining to use the filter, the prediction value of the pixel in the transition region of the block using the filter, wherein the means for calculating the prediction value comprises means for determining weights to apply to the value for the at least one neighboring pixel from the first partition and to the value for the at least one neighboring pixel from the second partition based on one or more conditions related to the pixel in the transition region, wherein the one or more conditions include at least one of the difference of pixel values along the line that is perpendicular to the geometric motion partition line, the difference between the motion vector for the first partition and the motion vector for the second partition, the direction of the geometric motion partition line, the reference frame indexes for the first partition and the second partition, the quantization parameters for the first partition and the second partition, and the numbers of pixels in the first partition and the second partition;

means for calculating a reconstructed value for the pixel in the transition region of the block based on the prediction value and the residual value; and means for outputting the reconstructed value of the pixel.

38. The apparatus of claim 37, wherein the geometric motion partition line passes through a horizontal boundary of the block and a vertical boundary of the block.

39. The apparatus of claim 37, wherein an origin of the block comprises the center of the block, and wherein the means for receiving the definition of the geometric motion partition line comprises means for receiving an angle value and a length value, the angle value comprising an angle of a line perpendicular to the geometric motion partition line and passing through the origin relative to an x-axis, and the length value comprising a distance from the origin to a point where the perpendicular line meets the geometric motion partition line.

40. The apparatus of claim 37, wherein the means for receiving the definition of the geometric motion partition line comprises means for receiving a slope value and a y-intercept value of the geometric motion partition line, wherein the slope value and the y-intercept value comprise integer values.

41. The apparatus of claim 40, wherein the means for calculating the prediction value comprises:

means for calculating a mask indicative of pixels of the block in the first partition and pixels of the block in the second partition; and means for locating the at least one neighboring pixel in the first partition and the at least one neighboring pixel in the second partition based on the mask using fixed point arithmetic.

42. The apparatus of claim 37, wherein the filter comprises a matrix of coefficients centered on the pixel in the transition region, and wherein the means for calculating the prediction value comprises:

means for calculating products of the coefficients of the filter and values of pixels collocated with the coefficients;

means for calculating the sum of the products; and means for dividing the sum of the products by the sum of the coefficients.

43. A computer program product comprising a non-transitory computer readable storage medium having stored thereon instructions that, when executed, cause a processor to:

receive an encoded block of video data, a definition of a geometric motion partition line that partitions the encoded block into a first partition and a second partition, and a residual value for a pixel in a transition region of the block;

determine whether to use a filter that applies a value for at least one neighboring pixel from the first partition and a value for at least one neighboring pixel from the second partition during calculation of a prediction value of the pixel in the transition region of the block based on one or more conditions related to the pixel in the transition region, wherein the one or more conditions include at least one of a difference of pixel values along a line that is perpendicular to the geometric motion partition line, a difference between a motion vector for the first partition and a motion vector for the second partition, a direction of the geometric motion partition line, reference frame indexes for the first partition and the second partition, quantization parameters for the first partition and the second partition, and numbers of pixels in the first partition and the second partition;

in response to determining to use the filter, calculate the prediction value of the pixel in the transition region of the block using the filter, wherein the instructions that cause the processor to calculate the prediction value comprise instructions that cause the processor to determine weights to apply to the value for the at least one neighboring pixel from the first partition and to the value for the at least one neighboring pixel from the second partition based on one or more conditions related to the pixel in the transition region, wherein the one or more conditions include at least one of the difference of pixel values along the line that is perpendicular to the geometric motion partition line, the difference between the motion vector for the first partition and the motion vector for the second partition, the direction of the geometric motion partition line, the reference frame indexes for the first partition and the second partition, the quantization parameters for the first partition and the second partition, and the numbers of pixels in the first partition and the second partition;

calculate a reconstructed value for the pixel in the transition region of the block based on the prediction value and the residual value; and output the reconstructed value of the pixel.

44. The computer program product of claim 43, wherein the geometric motion partition line passes through a horizontal boundary of the block and a vertical boundary of the block.

45. The computer program product of claim 43, wherein an origin of the block comprises the center of the block, and wherein the instructions that cause the processor to receive the definition of the geometric motion partition line comprise instructions that cause the processor to receive an angle value and a length value, the angle value comprising an angle of a line perpendicular to the geometric motion partition line and passing through the origin relative to an x-axis, and the length value comprising a distance from the origin to a point where the perpendicular line meets the geometric motion partition line.

46. The computer program product of claim 43, wherein the instructions that cause the processor to receive the definition of the geometric motion partition line comprise instructions that cause the processor to receive a slope value and a y-intercept value of the geometric motion partition line, wherein the slope value and the y-intercept value comprise integer values.

47. The computer program product of claim 46, wherein the instructions that cause the processor to calculate the prediction value comprise instructions that cause the processor to:

calculate a mask indicative of pixels of the block in the first partition and pixels of the block in the second partition; and locate the at least one neighboring pixel in the first partition and the at least one neighboring pixel in the second partition based on the mask using fixed point arithmetic.

48. The computer program product of claim 43, wherein the filter comprises a matrix of coefficients centered on the pixel in the transition region, and wherein the instructions that cause the processor to calculate the prediction value comprise instructions that cause the processor to:

calculate products of the coefficients of the filter and values of pixels collocated with the coefficients;

calculate the sum of the products; and divide the sum of the products by the sum of the coefficients.

* * * * *